(12) United States Patent
Stoppa et al.

(10) Patent No.: US 9,092,665 B2
(45) Date of Patent: Jul. 28, 2015

(54) SYSTEMS AND METHODS FOR INITIALIZING MOTION TRACKING OF HUMAN HANDS

(71) Applicant: Aquifi, Inc., Palo Alto, CA (US)

(72) Inventors: Michele Stoppa, Mountain View, CA (US); Britta Hummel, Berkeley, CA (US); Carlo Dal Mutto, Mountain View Sunnyvale, CA (US); Giuliano Pasqualotto, Mansuè Mountain View, AZ (US)

(73) Assignee: Aquifi, Inc, Palo Alto, CA (US)

( * ) Notice: Subject to any disclaimer, the term of this patent is extended or adjusted under 35 U.S.C. 154(b) by 195 days.

(21) Appl. No.: 13/900,015

(22) Filed: May 22, 2013

(65) Prior Publication Data

US 2014/0211991 A1     Jul. 31, 2014

Related U.S. Application Data

(60) Provisional application No. 61/776,590, filed on Mar. 11, 2013, provisional application No. 61/849,661, filed on Jan. 30, 2013.

(51) Int. Cl.
*G06K 9/00* (2006.01)
*G06T 7/20* (2006.01)

(52) U.S. Cl.
CPC .......... *G06K 9/00355* (2013.01); *G06T 7/2046* (2013.01); *G06T 2207/30196* (2013.01)

(58) Field of Classification Search
CPC ............. G06K 9/00355; G06T 7/2046; G06T 2207/30196
See application file for complete search history.

(56) References Cited

U.S. PATENT DOCUMENTS

| 5,454,043 A | 9/1995 | Freeman |
| 6,191,773 B1 | 2/2001 | Maruno et al. |

(Continued)

FOREIGN PATENT DOCUMENTS

| WO | 9749262 A1 | 12/1997 |
| WO | 2005/091125 A2 | 9/2005 |

(Continued)

OTHER PUBLICATIONS

Forssen et al., "Shape Descriptors for Maximally Stable Extremal Regions", Computer Vision, 2007. ICCV 2007. IEEE 11th International Conference on, 1-8.*

(Continued)

*Primary Examiner* — Katrina Fujita
(74) *Attorney, Agent, or Firm* — Christie, Parker & Hale, LLP

(57) ABSTRACT

Systems and methods for initializing motion tracking of human hands are disclosed. One embodiment includes a processor; a reference camera; and memory containing: a hand tracking application; and a plurality of edge feature templates that are rotated and scaled versions of a base template. The hand tracking application configures the processor to: determine whether any pixels in a frame of video are part of a human hand, where a part of a human hand is identified by searching the frame of video data for a grouping of pixels that have image gradient orientations that match the edge features of one of the plurality of edge feature templates; track the motion of the part of the human hand visible in a sequence of frames of video; confirm that the tracked motion corresponds to an initialization gesture; and commence tracking the human hand as part of a gesture based interactive session.

55 Claims, 13 Drawing Sheets

(56) References Cited

U.S. PATENT DOCUMENTS

| | | |
|---|---|---|
| 6,323,942 B1 | 11/2001 | Bamji |
| 6,512,838 B1 | 1/2003 | Rafii et al. |
| 6,515,740 B2 | 2/2003 | Bamji et al. |
| 6,522,395 B1 | 2/2003 | Bamji et al. |
| 6,580,496 B2 | 6/2003 | Bamji et al. |
| 6,587,186 B2 | 7/2003 | Bamji et al. |
| 6,614,422 B1 | 9/2003 | Rafii et al. |
| 6,674,895 B2 | 1/2004 | Rafii et al. |
| 6,678,039 B2 | 1/2004 | Charbon |
| 6,690,354 B2 | 2/2004 | Sze |
| 6,690,618 B2 | 2/2004 | Tomasi et al. |
| 6,710,770 B2 | 3/2004 | Tomasi et al. |
| 6,778,699 B1 * | 8/2004 | Gallagher ............... 382/165 |
| 6,876,775 B2 | 4/2005 | Torunoglu |
| 6,906,793 B2 | 6/2005 | Bamji et al. |
| 6,919,549 B2 | 7/2005 | Bamji et al. |
| 6,944,315 B1 | 9/2005 | Zipperer et al. |
| 7,006,236 B2 | 2/2006 | Tomasi et al. |
| 7,031,525 B2 * | 4/2006 | Beardsley ............... 382/199 |
| 7,038,659 B2 | 5/2006 | Rajkowski |
| 7,050,177 B2 | 5/2006 | Tomasi et al. |
| 7,151,530 B2 | 12/2006 | Roeber et al. |
| 7,157,685 B2 | 1/2007 | Bamji et al. |
| 7,173,230 B2 | 2/2007 | Charbon |
| 7,176,438 B2 | 2/2007 | Bamji et al. |
| 7,203,356 B2 | 4/2007 | Gokturk et al. |
| 7,212,663 B2 | 5/2007 | Tomasi |
| 7,274,800 B2 * | 9/2007 | Nefian et al. ............ 382/103 |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,433,029 B1 | 10/2008 | Hsu |
| 7,450,220 B2 | 11/2008 | O'Connor et al. |
| 7,464,351 B2 | 12/2008 | Bamji et al. |
| 7,471,376 B2 | 12/2008 | Bamji et al. |
| 7,507,947 B2 | 3/2009 | Bamji et al. |
| 7,511,801 B1 | 3/2009 | Rafii et al. |
| 7,519,201 B2 * | 4/2009 | Yang et al. ............ 382/118 |
| 7,526,120 B2 | 4/2009 | Gokturk et al. |
| 7,636,150 B1 | 12/2009 | McCauley et al. |
| 7,653,833 B1 | 1/2010 | Miller et al. |
| 7,653,883 B2 | 1/2010 | Hotelling et al. |
| 7,665,041 B2 | 2/2010 | Wilson et al. |
| 7,719,662 B2 | 5/2010 | Bamji et al. |
| 7,741,961 B1 | 6/2010 | Rafii et al. |
| 7,791,715 B1 | 9/2010 | Bamji |
| 7,805,003 B1 | 9/2010 | Cohen et al. |
| 7,877,707 B2 | 1/2011 | Westerman et al. |
| 7,936,449 B1 | 5/2011 | Bamji et al. |
| 7,994,465 B1 | 8/2011 | Bamji et al. |
| 8,009,865 B2 * | 8/2011 | Kim et al. ............ 382/103 |
| 8,009,871 B2 | 8/2011 | Rafii et al. |
| D645,493 S | 9/2011 | Zhao |
| 8,086,971 B2 | 12/2011 | Radivojevic et al. |
| 8,134,637 B2 | 3/2012 | Rossbach et al. |
| 8,139,141 B2 | 3/2012 | Bamji et al. |
| 8,139,142 B2 | 3/2012 | Bamji et al. |
| 8,175,412 B2 * | 5/2012 | Basri et al. ............ 382/278 |
| 8,179,604 B1 | 5/2012 | Prada Gomez et al. |
| 8,180,114 B2 | 5/2012 | Nishihara et al. |
| 8,194,233 B2 | 6/2012 | Bamji |
| 8,203,699 B2 | 6/2012 | Bamji et al. |
| 8,212,859 B2 | 7/2012 | Tang et al. |
| 8,232,990 B2 | 7/2012 | King et al. |
| 8,265,350 B2 | 9/2012 | Torii et al. |
| 8,274,535 B2 | 9/2012 | Hildreth et al. |
| 8,314,924 B2 | 11/2012 | Bamji et al. |
| 8,339,359 B2 | 12/2012 | Hsieh et al. |
| 8,363,212 B2 | 1/2013 | Bamji et al. |
| 8,368,795 B2 | 2/2013 | Lo et al. |
| 8,462,132 B2 | 6/2013 | Ren et al. |
| 8,483,489 B2 * | 7/2013 | Van Beek et al. ............ 382/217 |
| 8,525,876 B2 | 9/2013 | Fan et al. |
| 8,539,359 B2 | 9/2013 | Rapaport et al. |
| 8,552,983 B2 * | 10/2013 | Chiu ............ 345/166 |
| 8,587,773 B2 | 11/2013 | Bamji et al. |
| 8,589,033 B2 | 11/2013 | Rafii et al. |
| 8,615,108 B1 | 12/2013 | Stoppa et al. |
| 8,625,846 B2 * | 1/2014 | Dahl ............ 382/103 |
| 8,643,701 B2 * | 2/2014 | Nguyen et al. ............ 348/47 |
| 8,655,021 B2 | 2/2014 | Dal Mutto et al. |
| 8,666,115 B2 * | 3/2014 | Perski et al. ............ 382/103 |
| 8,675,182 B2 | 3/2014 | Bamji |
| 8,681,124 B2 | 3/2014 | Bamji et al. |
| 8,686,943 B1 | 4/2014 | Rafii |
| 8,693,724 B2 | 4/2014 | Ahmed et al. |
| 8,787,663 B2 | 7/2014 | Litvak et al. |
| 8,818,027 B2 * | 8/2014 | Forutanpour et al. ......... 382/103 |
| 8,824,737 B2 | 9/2014 | Gurman et al. |
| 8,830,312 B2 | 9/2014 | Hummel et al. |
| 8,836,768 B1 | 9/2014 | Rafii et al. |
| 8,840,466 B2 | 9/2014 | Kareemi et al. |
| 8,934,675 B2 | 1/2015 | Dal Mutto et al. |
| 8,941,588 B2 * | 1/2015 | Minnen ............ 345/158 |
| 2002/0112095 A1 | 8/2002 | Ford et al. |
| 2002/0140633 A1 | 10/2002 | Rafii et al. |
| 2003/0021032 A1 | 1/2003 | Bamji et al. |
| 2003/0132921 A1 | 7/2003 | Torunoglu et al. |
| 2003/0132950 A1 | 7/2003 | Surucu et al. |
| 2003/0165048 A1 | 9/2003 | Bamji et al. |
| 2003/0169906 A1 | 9/2003 | Gokturk et al. |
| 2003/0174125 A1 | 9/2003 | Torunoglu et al. |
| 2004/0046744 A1 | 3/2004 | Rafii et al. |
| 2004/0066500 A1 | 4/2004 | Gokturk et al. |
| 2004/0170323 A1 | 9/2004 | Cootes et al. |
| 2005/0271279 A1 | 12/2005 | Fujimura et al. |
| 2006/0187214 A1 | 8/2006 | Gillespie et al. |
| 2006/0197753 A1 | 9/2006 | Hotelling |
| 2006/0241371 A1 | 10/2006 | Rafii et al. |
| 2006/0272436 A1 | 12/2006 | Lein et al. |
| 2008/0120577 A1 | 5/2008 | Ma et al. |
| 2008/0281523 A1 | 11/2008 | Dahl et al. |
| 2009/0021489 A1 | 1/2009 | Westerman et al. |
| 2009/0077161 A1 | 3/2009 | Hamilton, II et al. |
| 2009/0079813 A1 | 3/2009 | Hildreth |
| 2009/0103780 A1 | 4/2009 | Nishihara et al. |
| 2009/0153671 A1 | 6/2009 | Lee et al. |
| 2009/0183125 A1 | 7/2009 | Magal et al. |
| 2009/0228841 A1 | 9/2009 | Hildreth |
| 2009/0290811 A1 | 11/2009 | Imai |
| 2009/0307658 A1 | 12/2009 | Freitas et al. |
| 2010/0027845 A1 | 2/2010 | Kim et al. |
| 2010/0027846 A1 | 2/2010 | Xu et al. |
| 2010/0027892 A1 | 2/2010 | Guan et al. |
| 2010/0053151 A1 | 3/2010 | Marti et al. |
| 2010/0124949 A1 | 5/2010 | Demuynck et al. |
| 2010/0156676 A1 | 6/2010 | Mooring et al. |
| 2010/0192109 A1 | 7/2010 | Westerman et al. |
| 2010/0199228 A1 | 8/2010 | Latta et al. |
| 2010/0202663 A1 | 8/2010 | Kim et al. |
| 2010/0208038 A1 | 8/2010 | Kutliroff et al. |
| 2010/0211920 A1 | 8/2010 | Westerman et al. |
| 2010/0229125 A1 | 9/2010 | Cha |
| 2010/0235786 A1 | 9/2010 | Maizels et al. |
| 2010/0265316 A1 | 10/2010 | Sali et al. |
| 2010/0284082 A1 | 11/2010 | Shpunt et al. |
| 2010/0296368 A1 | 11/2010 | Dahl et al. |
| 2010/0306714 A1 | 12/2010 | Latta et al. |
| 2010/0321389 A1 | 12/2010 | Gay et al. |
| 2010/0329511 A1 | 12/2010 | Yoon et al. |
| 2011/0025827 A1 | 2/2011 | Shpunt et al. |
| 2011/0052006 A1 | 3/2011 | Gurman et al. |
| 2011/0069389 A1 | 3/2011 | Shpunt |
| 2011/0074675 A1 * | 3/2011 | Shiming et al. ............ 345/158 |
| 2011/0075259 A1 | 3/2011 | Shpunt |
| 2011/0096954 A1 | 4/2011 | Dahl |
| 2011/0103448 A1 | 5/2011 | Dahl et al. |

(56) References Cited

U.S. PATENT DOCUMENTS

| | | |
|---|---|---|
| 2011/0114857 A1 | 5/2011 | Akerman et al. |
| 2011/0115892 A1 | 5/2011 | Fan et al. |
| 2011/0134036 A1 | 6/2011 | Suggs |
| 2011/0134114 A1 | 6/2011 | Rais et al. |
| 2011/0148798 A1 | 6/2011 | Dahl |
| 2011/0149044 A1 | 6/2011 | Snin |
| 2011/0158508 A1 | 6/2011 | Shpunt et al. |
| 2011/0164032 A1 | 7/2011 | Shadmi |
| 2011/0173574 A1 | 7/2011 | Clavin et al. |
| 2011/0187878 A1 | 8/2011 | Mor et al. |
| 2011/0188054 A1 | 8/2011 | Petronius et al. |
| 2011/0193939 A1 | 8/2011 | Vassigh et al. |
| 2011/0197161 A1 | 8/2011 | Mattingly et al. |
| 2011/0205421 A1 | 8/2011 | Shpunt et al. |
| 2011/0211044 A1 | 9/2011 | Shpunt et al. |
| 2011/0211073 A1 | 9/2011 | Foster |
| 2011/0211754 A1 | 9/2011 | Litvak et al. |
| 2011/0219340 A1 | 9/2011 | Pathangay et al. |
| 2011/0221974 A1 | 9/2011 | Stern et al. |
| 2011/0222726 A1 | 9/2011 | Ruan |
| 2011/0243380 A1 | 10/2011 | Forutanpour et al. |
| 2011/0254762 A1 | 10/2011 | Dahl et al. |
| 2011/0254765 A1 | 10/2011 | Brand |
| 2011/0262006 A1 | 10/2011 | Nakano |
| 2011/0274357 A1 | 11/2011 | Iwamoto et al. |
| 2011/0286673 A1 | 11/2011 | Givon et al. |
| 2011/0289455 A1 | 11/2011 | Reville et al. |
| 2011/0291925 A1 | 12/2011 | Israel et al. |
| 2011/0291926 A1 | 12/2011 | Gokturk et al. |
| 2011/0291988 A1 | 12/2011 | Bamji et al. |
| 2011/0292036 A1 | 12/2011 | Sali et al. |
| 2011/0292181 A1 | 12/2011 | Acharya et al. |
| 2011/0292370 A1 | 12/2011 | Hills et al. |
| 2011/0292380 A1 | 12/2011 | Bamji |
| 2011/0293137 A1 | 12/2011 | Gurman et al. |
| 2011/0294574 A1 | 12/2011 | Yamada et al. |
| 2011/0295562 A1 | 12/2011 | Mehta et al. |
| 2011/0296353 A1 | 12/2011 | Ahmed et al. |
| 2011/0298704 A1 | 12/2011 | Krah |
| 2011/0300929 A1 | 12/2011 | Tardif et al. |
| 2011/0304541 A1* | 12/2011 | Dalal ............................ 345/158 |
| 2011/0310010 A1 | 12/2011 | Hoffnung et al. |
| 2011/0310125 A1 | 12/2011 | McEldowney et al. |
| 2012/0011454 A1 | 1/2012 | Droz et al. |
| 2012/0027252 A1 | 2/2012 | Liu et al. |
| 2012/0038986 A1 | 2/2012 | Pesach |
| 2012/0042150 A1 | 2/2012 | Saar |
| 2012/0042246 A1 | 2/2012 | Schwesinger |
| 2012/0050488 A1 | 3/2012 | Cohen et al. |
| 2012/0051605 A1 | 3/2012 | Nagar et al. |
| 2012/0069168 A1* | 3/2012 | Huang et al. .................... 348/77 |
| 2012/0070070 A1 | 3/2012 | Litvak |
| 2012/0078614 A1 | 3/2012 | Galor et al. |
| 2012/0092304 A1 | 4/2012 | Katz |
| 2012/0099403 A1 | 4/2012 | Dahl et al. |
| 2012/0106792 A1 | 5/2012 | Kang et al. |
| 2012/0140094 A1 | 6/2012 | Shpunt et al. |
| 2012/0140109 A1 | 6/2012 | Shpunt et al. |
| 2012/0169583 A1 | 7/2012 | Rippel et al. |
| 2012/0169671 A1 | 7/2012 | Yasutake |
| 2012/0176414 A1 | 7/2012 | Givon |
| 2012/0182464 A1 | 7/2012 | Shpunt et al. |
| 2012/0202569 A1 | 8/2012 | Maizels et al. |
| 2012/0204133 A1 | 8/2012 | Guendelman et al. |
| 2012/0206339 A1 | 8/2012 | Dahl |
| 2012/0218183 A1 | 8/2012 | Givon et al. |
| 2012/0223882 A1 | 9/2012 | Galor et al. |
| 2012/0243374 A1 | 9/2012 | Dahl et al. |
| 2012/0249744 A1 | 10/2012 | Pesach et al. |
| 2012/0268364 A1 | 10/2012 | Minnen |
| 2012/0274550 A1 | 11/2012 | Campbell et al. |
| 2012/0274610 A1 | 11/2012 | Dahl |
| 2012/0281240 A1 | 11/2012 | Cohen et al. |
| 2012/0299820 A1 | 11/2012 | Dahl |
| 2012/0304067 A1 | 11/2012 | Han et al. |
| 2012/0306876 A1 | 12/2012 | Shotton et al. |
| 2012/0309532 A1 | 12/2012 | Ambrus et al. |
| 2012/0313848 A1 | 12/2012 | Galor et al. |
| 2012/0313900 A1 | 12/2012 | Dahl |
| 2012/0327125 A1 | 12/2012 | Kutliroff et al. |
| 2013/0014052 A1 | 1/2013 | Frey et al. |
| 2013/0038601 A1 | 2/2013 | Han et al. |
| 2013/0038881 A1 | 2/2013 | Pesach et al. |
| 2013/0038941 A1 | 2/2013 | Pesach et al. |
| 2013/0044053 A1 | 2/2013 | Galor et al. |
| 2013/0050080 A1 | 2/2013 | Dahl et al. |
| 2013/0055120 A1 | 2/2013 | Galor et al. |
| 2013/0055143 A1 | 2/2013 | Martin et al. |
| 2013/0055150 A1 | 2/2013 | Galor |
| 2013/0057654 A1 | 3/2013 | Rafii et al. |
| 2013/0063487 A1 | 3/2013 | Spiegel et al. |
| 2013/0069876 A1 | 3/2013 | Cheng et al. |
| 2013/0094329 A1 | 4/2013 | Dahl et al. |
| 2013/0106692 A1 | 5/2013 | Maizels et al. |
| 2013/0107021 A1 | 5/2013 | Maizels et al. |
| 2013/0135312 A1 | 5/2013 | Yang et al. |
| 2013/0147770 A1 | 6/2013 | Dahl et al. |
| 2013/0155031 A1 | 6/2013 | Dahl et al. |
| 2013/0162527 A1 | 6/2013 | Dahl |
| 2013/0176258 A1 | 7/2013 | Dahl et al. |
| 2013/0179034 A1 | 7/2013 | Pryor |
| 2013/0194180 A1 | 8/2013 | Ahn et al. |
| 2013/0201316 A1 | 8/2013 | Binder et al. |
| 2013/0211843 A1* | 8/2013 | Clarkson ........................ 704/275 |
| 2013/0216094 A1 | 8/2013 | DeLean |
| 2013/0236089 A1 | 9/2013 | Litvak et al. |
| 2013/0335573 A1 | 12/2013 | Forutanpour at al. |
| 2014/0007022 A1* | 1/2014 | Diaz et al. ..................... 715/863 |
| 2014/0043598 A1 | 2/2014 | Bamji et al. |
| 2014/0119599 A1 | 5/2014 | Dal Mutto et al. |
| 2014/0152569 A1* | 6/2014 | Liu et al. ........................ 345/168 |
| 2014/0173440 A1 | 6/2014 | Mutto et al. |
| 2014/0211992 A1 | 7/2014 | Stoppa et al. |
| 2014/0298273 A1 | 10/2014 | Blackstone et al. |

FOREIGN PATENT DOCUMENTS

| | | |
|---|---|---|
| WO | 2006/011153 A2 | 2/2006 |
| WO | 2006/011153 A3 | 2/2006 |
| WO | 2007/052262 A2 | 5/2007 |
| WO | 2007/052262 A3 | 5/2007 |
| WO | 2008/126069 A2 | 10/2008 |
| WO | 2008/126069 A3 | 10/2008 |
| WO | 2006011153 A3 | 10/2008 |
| WO | 2007052262 A3 | 4/2009 |
| WO | 2008126069 A3 | 4/2009 |
| WO | 2009/128064 A2 | 10/2009 |
| WO | 2009/128064 A3 | 10/2009 |
| WO | 2009/142443 A2 | 11/2009 |
| WO | 2009128064 A3 | 1/2010 |
| WO | 2010/026587 A1 | 3/2010 |
| WO | 2010030296 A1 | 3/2010 |
| WO | 2010/046901 A2 | 4/2010 |
| WO | 2010/046901 A3 | 4/2010 |
| WO | 2010/086866 A1 | 8/2010 |
| WO | 2010/096279 A2 | 8/2010 |
| WO | 2010/096279 A3 | 8/2010 |
| WO | 2010046901 A3 | 8/2010 |
| WO | 2010/103482 A2 | 9/2010 |
| WO | 2010/103482 A3 | 9/2010 |
| WO | 2010096279 A3 | 11/2010 |
| WO | 2010103482 A3 | 11/2010 |
| WO | 2011/013079 A1 | 2/2011 |
| WO | 2011/033519 A1 | 3/2011 |
| WO | 2011/045789 A1 | 4/2011 |
| WO | 2012/011044 A1 | 1/2012 |
| WO | 2012/020380 A1 | 2/2012 |
| WO | 2012/020410 A2 | 2/2012 |
| WO | 2012/066501 A1 | 5/2012 |
| WO | 2012/081012 A1 | 6/2012 |
| WO | 2012/093394 A2 | 7/2012 |
| WO | 2012/095756 A2 | 7/2012 |
| WO | 2012/098534 A1 | 7/2012 |
| WO | 2012/107892 A2 | 8/2012 |

(56) References Cited

FOREIGN PATENT DOCUMENTS

| WO | 2012/107892 A3 | 8/2012 |
|---|---|---|
| WO | 2012/119633 A1 | 9/2012 |
| WO | 2012/119885 A1 | 9/2012 |
| WO | 2012107892 A3 | 11/2012 |
| WO | 2012/164562 A1 | 12/2012 |
| WO | 2013/008236 A1 | 1/2013 |
| WO | 2013/018099 A2 | 2/2013 |
| WO | 2013/021385 A2 | 2/2013 |
| WO | 2012095756 A3 | 7/2013 |
| WO | 2014120554 A2 | 8/2014 |

OTHER PUBLICATIONS

Vincent et al., "Matching with epipolar gradient features and edge transfer", Image Processing, 2003. ICIP 2003. Proceedings. 2003 International Conference on (vol. 1), I-277-80.*

"PointGrab Announces New Hand Gesture Control Solution for the Latest Premium Samsung Smart TV Models", Yahoo! Finance, Retrieved on Apr. 4, 2013, Retrieved from http://www.finance.yahoo.com/news/pointgrab-announces-hand-gesture-control-22000959.html, 2 pgs.

Belaroussi et al., "Comparison of Different Combination Strategies for Face Localization", Proceedings of the 2006 International Conference on Image Processing, Computer Vision, & Pattern Recognition, Lase Vegas, Nevada, Jun. 26-29, 2006, pp. 383-389.

Forsyth, "Computer Vision—Modern Approach", Recognition as Template Matching, 46 pgs, 2012.

Hasan et al., "Real Time Fingers and Palm Locating using Dynamic Circle Templates", International Journal of Computer Applications, vol. 41, No. 6, Mar. 2012, pp. 33-43.

Kerdvibulvech et al., "Markerless Guitarist Fingertip Detection Using a Bayesian Classifier and a Template Matching for Supporting Guitarists", Proc.10th Virtual Reality Int. Conf., Apr. 2008, 7 pgs.

Kolsch et al., "Flocks of Features for Tracking Articulated Objects", Retrieved from http://www.cs.ucsb.edu/~mturk/pubs/KolschBook05.pdf, pp. 1-18, Index, 2005.

Lin, John, "Visual Hand Tracking and Gesture Analysis", Dissertation, University of Illinois at Urbana-Champaign, 2004, 116 pgs.

Murase et al., "Gesture Keyboard Requiring Only One Camera", ACM UIST'11, Oct. 16-19, 2011, Santa Barbara, CA, pp. 1-2.

Nosowitz, "The Second Wave of Gesture-Controlled TVs", Popular Science, Retrieved on Apr. 4, 2013, Retrieved from: www.popsci.com/gadgets/article/2012-01/second-wave-gesture-controlled-tvs, 6 pgs.

Onishi et al., "3D Human Posture Estimation Using HOG Features of Monocular Images", Pattern Recognition, Peng-Yeng Yin (Ed.), Intech, DO1:10.5772/7541., Oct. 1, 2009, pp. 1-11.

Rautaray et al., "Vision Based Hand Gesture Recognition for Human Computer Interaction: A Survey", Artificial Intelligence Review, Springer, Nov. 6, 2012, 54 pgs.

Thayananthan, "Template-based Pose Estimation and Tracking of 3D Hand Motion", Dissertation, University of Cambridge, 2005, 172 pgs.

Canesta3D, Canesta 3D ToF Sensor Demo for Living Room, Youtube, Oct. 28, 2010, Retrieved from: http://www.youtube.com/watch?v=TmKShSHOSYU.

Canesta3D, "Canesta PC demo video", Youtube, Oct. 25, 2010, Retrieved from: http://www.youtube.com/watch?v=I36Aqk1A6vY.

Canesta3D, "Canesta TV Gesture User Interface Demo", Youtube, May 29, 2009, Retrieved from: http://www.youtube.com/watch?v=uR27dPHI7dQ.

Canesta3D, "Canesta's latest 3D Sensor—"Cobra" . . . highest res CMOS 3D depth sensor in the world", Youtube, Oct. 25, 2010, Retrieved from: http://www.youtube.com/watch?v=5_PVx1NbUZQ.

Canesta3D, "Future of Remote Control", Youtube, Oct. 29, 2009, Retrieved from: http://www.youtube.com/watch?v=vnfdoDHiNil.

Canesta3D, "Point Cloud Demo, using Canesta's 320×200 3D Tof Image Sensor", Youtube, Oct. 28, 2010, Retrieved from: http://www.youtube.com/watch?v=4xlXsJuH74c.

Carmody, Tim, "Why 'Gorilla Arm Syndrome' Rules Out Multitouch Notebook Displays", Wired, Oct. 10, 2010, Retrieved from http://www.wired.com/gadgetlab/2010/10/gorilla-arm-multitouch/, 3 pgs.

International Search Report and Written Opinion for International Application PCT/US2014/012748, report completed Nov. 30, 2014, Mailed Jan. 14, 2015, 17 Pgs.

"0V7740 VGA product brief", OmniVision, Retrieved from: http://www.ovt.com/download_document.php?type=sensor&sensorid=83, 2 pgs.

Zhang, Zhengyou, "Flexible Camera Calibration by Viewing a Plane From Unknown Orientations", Microsoft Research, Redmond, WA, 8 pgs.

* cited by examiner

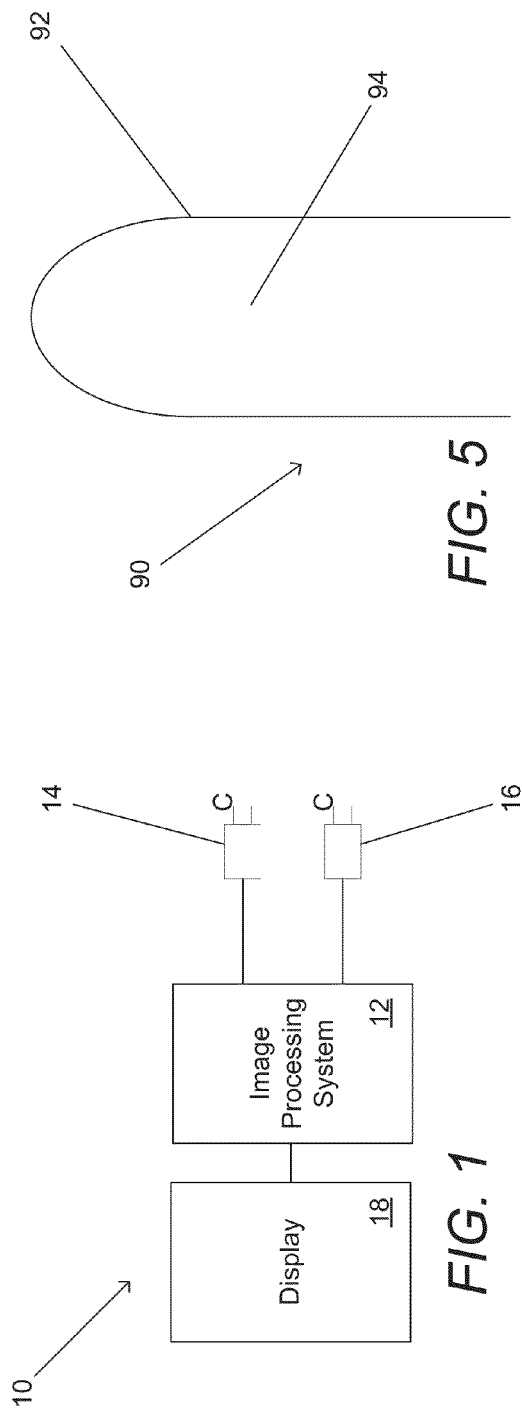
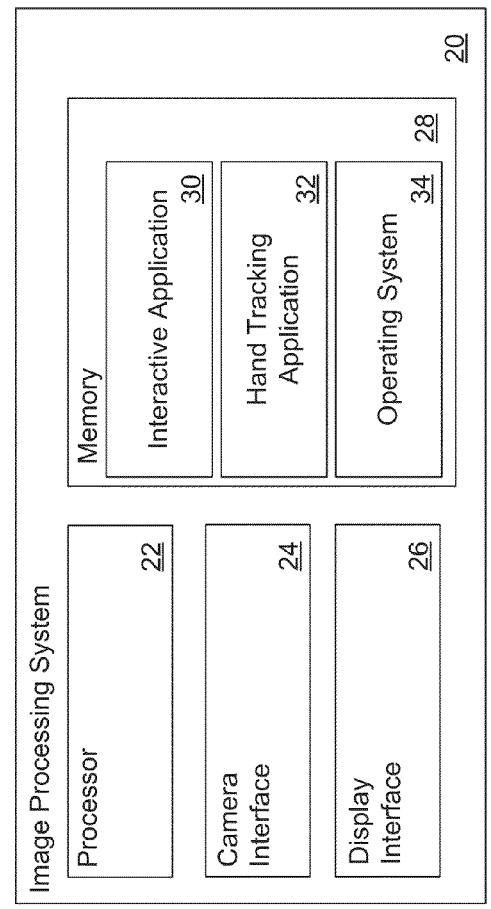
FIG. 1
FIG. 2
FIG. 5

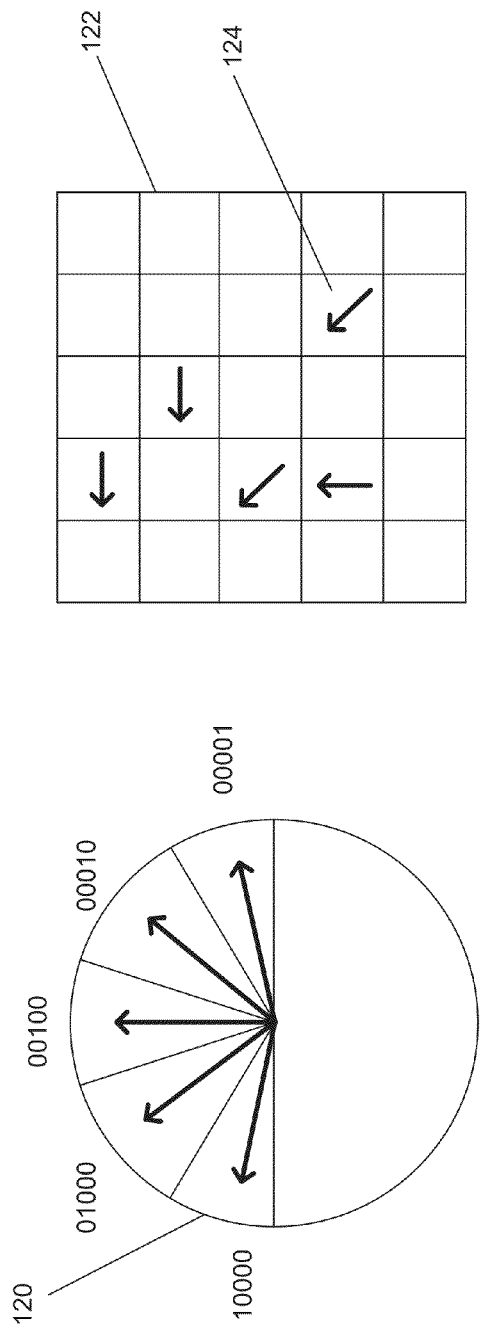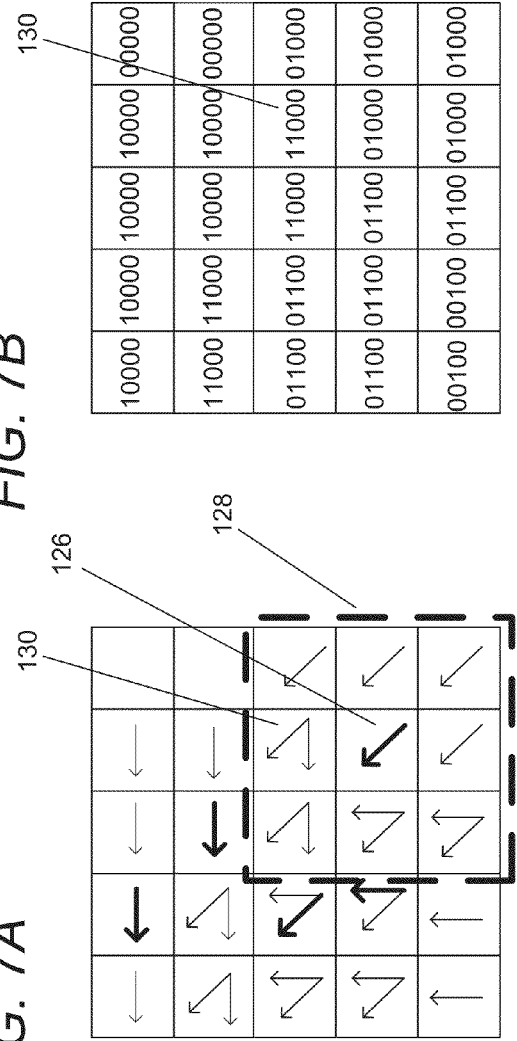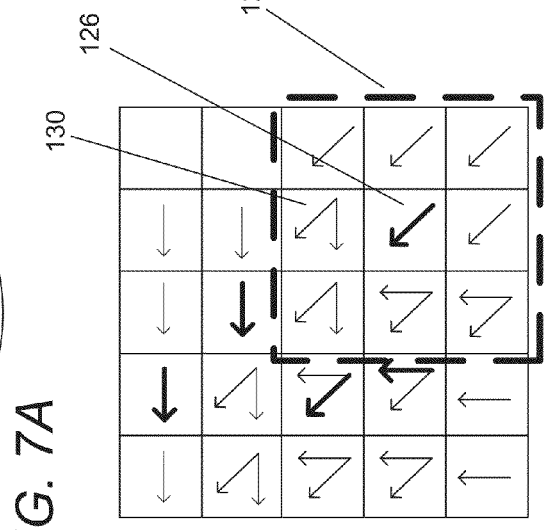
FIG. 7A  FIG. 7B  FIG. 7C  FIG. 7D

SYSTEMS AND METHODS FOR INITIALIZING MOTION TRACKING OF HUMAN HANDS

CROSS-REFERENCE TO RELATED APPLICATIONS

The current application claims priority under 35 U.S.C. §119(e) to U.S. Provisional Patent Application Ser. No. 61/849,661, entitled "Method for Exploiting Wake-up In Gesture Interfaces" filed Jan. 30, 2013 and U.S. Provisional Patent Application Ser. No. 61/776,590 entitled "Systems and Methods for Initializing Motion Tracking of Human Hands" filed Mar. 11, 2013, the disclosures of which are incorporated herein by reference in their entirety.

FIELD OF THE INVENTION

The present invention relates to object detection using machine vision and more specifically to detection of hands within a scene.

BACKGROUND

Real-time object detection is a challenging task in computer vision. A number of major algorithmic paradigms exist for performing object detection in two dimensional (2D) images including local 2D-descriptor based object detection processes, global 2D descriptor based (bag-of-words) object detection processes and template based object detection processes.

Local 2D-descriptor based approaches typically apply interest point detectors to detect salient points in an image, which are then characterized by a descriptor. The descriptor is matched against a database of descriptors found on the object of interest. An object hypothesis is formed if a sufficient number of such matches is found in the image. As a prerequisite, however, these methods typically require image corners or textured areas.

For objects that lack a sufficient number of image corners and/or textured areas to successfully perform a local 2D-descriptor based process, a global 2D descriptor can be utilized. A global 2D-descriptor can be formed by studying patch statistics. However, a global 2D-descriptor typically does not exploit the spatial relations of points of interest. Therefore, 2D-descriptors tends to produce a large number of false matches.

A more discriminative way of exploiting object appearance is to take spatial relations into account. This can be achieved by forming a template image of the object of interest. The template contains the relative spatial relation of information points on the object. An object hypothesis is formed in the image via template matching, which can involve sliding a template over each pixel (possibly after subsampling) and computing the similarity between an image patch and the template using a similarity metric.

SUMMARY OF THE INVENTION

Systems and methods for initializing motion tracking of human hands in accordance with embodiments of the invention are illustrated. One embodiment includes a processor; a reference camera configured to capture sequences of frames of video data, where each frame of video data comprises intensity information for a plurality of pixels; and memory containing: a hand tracking application; and a set of edge feature templates comprising a plurality of edge feature templates that are rotated and scaled versions of a base template. In addition, the hand tracking application configures the processor to: obtain a sequence of frames of video data from the reference camera; compare successive frames of video data from the sequence of frames of video data for pixels that are moving; determine whether any of the pixels that changed are part of a human hand visible in the sequence of frames of video data, where a part of a human hand is identified by searching the frame of video data for a grouping of pixels that have image gradient orientations that match the edge features of one of the plurality of edge feature templates; track the motion of the part of the human hand visible in the sequence of frames of video data; confirm that the tracked motion of the part of the human hand visible in the sequence of frames of video data corresponds to a predetermined initialization gesture; and commence tracking the human hand as part of a gesture based interactive session.

In a further embodiment, the hand tracking application configures the processor to identify pixels in successive frames of video that change from one frame to the next by subtracting the successive frames of video to identify pixel value differences exceeding a predetermined threshold.

In another embodiment, the predetermined initialization gesture comprises a finger oscillating from side to side within a predetermined gesture range.

In a still further embodiment, the hand tracking application configures the processor to confirm that the tracked motion of the part of the human hand visible in the sequence of frames of video data corresponds to a predetermined initialization gesture by verifying that the extent of the motion of a human hand visible in the sequence of frames of video data is below a predetermined threshold.

In still another embodiment, the hand tracking application further configures the processor to initialize the image capture settings of the reference camera used during the gesture based interactive session.

In a yet further embodiment, the hand tracking application configures the processor to: obtain the sequence of frames of video data from the reference camera using initial image capture settings; and adjust the exposure and gain of the reference camera as additional frames of video data are captured by the reference camera so that the brightness of at least one pixel that is part of a human hand visible in the additional frames of video data satisfies a predetermined criterion.

In yet another embodiment, the hand tracking application configures the processor to determine the initial image capture settings using auto-exposure and auto-gain controls of the reference camera.

In a further embodiment again, the hand tracking application configures the processor to determine an initial white balance setting using automatic white balance controls of the reference camera.

In another embodiment again, the hand tracking application configures the processor to adjust the exposure and gain of the reference camera as additional frames of video data are captured by the reference camera by adjusting the exposure and gain of the reference camera as additional frames of video data are captured by the reference camera so that the brightest pixel that remains after performing outlier rejection and that is part of a human hand visible in the additional frames of video data is a predetermined brightness value.

In a further additional embodiment, the hand tracking application configures the processor to determine the brightest pixel remains after performing outlier rejection and that is part of a human hand visible in one of the additional frames of video data by performing a search within a region defined by the one of the plurality of edge feature templates used to identify the part of the human hand visible in the additional frame of video data.

In another additional embodiment, the hand tracking application configures the processor to adjust the exposure and gain of the reference camera as additional frames of video data are captured by the reference camera so that pixels that are part of a human hand visible in the additional frames of video data satisfy a predetermined brightness criterion.

In a still yet further embodiment, the hand tracking application configures the processor to adjust the exposure and gain of the reference camera as additional frames of video data are captured by the reference camera so that pixels that are part of a human hand visible in the additional frames of video data satisfy a predetermined average brightness criterion.

In still yet another further embodiment, the hand tracking application configures the processor to adjust the exposure and gain of the reference camera as additional frames of video data are captured by the reference camera so that the darkest pixel that remains after performing outlier rejection and that is part of a human hand visible in the additional frames of video data satisfies a predetermined brightness criterion.

In a still further embodiment again, the hand tracking application configures the processor to adjust the white level balance of the reference camera based upon the exposure and gain settings of the reference camera.

In still another embodiment again, each frame of video data captured by the reference view camera includes color information for a plurality of pixels comprising intensity information in a plurality of color channels; and the hand tracking application further configures the processor to initialize a skin color classifier used during the gesture based interactive session.

In a still further additional embodiment, the hand tracking application further configures the processor to initialize a skin color classifier based upon the colors of a plurality of pixels that are part of a human hand visible in the sequence of frames of video data.

In still another additional embodiment, the hand tracking application further configures the processor to initialize a skin color classifier based upon the colors of a plurality of pixels that are part of a human hand visible in the sequence of frames of video data by forming a histogram of the colors of the plurality of pixels.

In a yet further embodiment again, the histogram is a two dimensional histogram of pixel intensity values in Red and Green color channels.

In yet another embodiment again, the histogram is determined using normalized intensities in the Red channel $R/(R+G+B)$ and normalized intensities in the Green channel $R/(R+G+B)$.

In a yet further additional embodiment, the hand tracking application further configures the processor to determine skin color information by identifying the pixel colors within the histogram satisfying a predetermined skin tone criterion.

In yet another additional embodiment, the hand tracking application further configures the processor to apply a threshold to the histogram to determine pixel intensities in Red and Green color channels that will be considered to correspond to skin colors.

In a further additional embodiment again, the criterion involves the pixel color being within a threshold distance of at least one selected from the group consisting of the mean, median and mode pixel color of the histogram.

In another additional embodiment again, the criterion involves the pixel colors of a threshold percentage of pixels within the histogram being considered to be skin colors.

In another further embodiment, the hand tracking application further configures the processor to define a 3D interaction zone relative to the motion of the part of the human hand visible in the sequence of frames of video data.

In still another further embodiment, the hand tracking application configures the processor to identify gestures within an interaction zone during a gesture based interactive session.

In yet another further embodiment, the interaction zone is defined relative to the location of a detected part of a human hand based upon a predetermined gesture range.

In a further embodiment, the interaction zone is defined relative to the mean location of a detected part of a human hand during a detected initialization gesture.

In another embodiment, the interaction zone is defined relative to the final location of a detected part of a human hand at the end of a detected initialization gesture.

In a still further embodiment, the hand tracking application configures the processor to determine the size of the interaction zone within a frame of video data obtained from the reference camera based upon the distance of the tracked hand from a reference camera, the relative position of the tracked hand in the field of view, the resolution of the reference camera and the size of the interaction zone in 3D space.

In still another embodiment, the interaction zone is a predetermined size in 3D space.

In a yet further embodiment, the interaction zone is a predetermined size determined based upon human physiology.

In yet another embodiment, the interaction zone corresponds to a 3D space that is no greater than 160 mm×90 mm×200 mm.

In a further additional embodiment, the hand tracking application configures the processor to determine the size of the interaction zone based upon the scale of at least one of the plurality of edge feature templates that matches a part of a human hand visible in the sequence of frames of video data and the distance of the part of the human hand visible in the sequence of frames of video data from the reference camera.

In another additional embodiment, the hand tracking application configures the processor to determine the size of the interaction zone based upon the region in 3D space in which motion of the part of a human hand is observed during the initialization gesture.

In another further embodiment, the hand tracking application configures the processor to determine the size of the interaction zone based upon a 2D region within the sequence of frames of video data in which motion of the part of a human hand is observed during the initialization gesture.

In a further embodiment again, the hand tracking application configures the processor to define an interaction zone in 3D space and to map the interaction zone into a 2D region in the field of view of each camera.

In another embodiment again, the hand tracking application configures the processor to crop images obtained from each camera to the 2D interaction zone to reduce the number of pixels processed during the gesture based interactive session.

In another further embodiment again, the hand tracking application further configures the processor to: determine the size of a part of a human hand visible in the sequence of frames of video data by determining the scale of the edge feature template that matches the part of the human hand visible in the sequence of frames of video data at a known distance from the reference camera; and use the size of the part of a human hand visible in the sequence of frames to determine the distance to the part of a human hand visible in additional frames of video captured by the reference camera during the gesture based interactive session.

In another further additional embodiment, the edge features of the base template are synthetically generated.

In still yet another further embodiment, the plurality of edge feature templates are stored in a data structure that includes metadata describing the rotation and scaling applied to the finger template to obtain a given edge feature template within the data structure.

In still another further embodiment again, the edge feature template is a binary edge map.

In still another further additional embodiment, the edge feature template is a map of image gradient orientations.

In yet another further embodiment again, the hand tracking application configures the processor to search the frame of video data for a grouping of pixels that have image gradient orientations that match a given edge feature template from the plurality of edge feature templates by: selecting a grouping of pixels; searching within a predetermined neighborhood of pixels relative to each edge feature in the given edge feature template to find the image gradient orientation that is most similar to the image gradient orientation of the edge feature; and determining the similarity of the grouping of pixels to the given edge feature template based upon a measure of the similarity of the most similar image gradient orientations found within the grouping of pixels for each of the edge features in the given edge feature template.

In yet another further additional embodiment, the hand tracking application configures the processor to determine image gradient orientation based upon a change in intensity of neighboring pixels in the video data.

In another further additional embodiment again, each frame of video data captured by the reference view camera includes color information for a plurality of pixels comprising intensity information in a plurality of color channels; and the hand tracking application configures the processor to determine image gradient orientation based upon a change in the color of neighboring pixels in the video data in at least one color channel.

In a further embodiment, the video data comprises color information for a plurality of pixels in blue, green and red color channels.

In another embodiment, the hand tracking application configures the processor to determine image gradient orientation by computing the orientation of gradients in red and green color channels separately and using the gradient orientation of the channel whose magnitude is the largest.

In a still further embodiment, the hand tracking application configures the processor to determine image gradient orientation by computing the orientation of gradients in blue, green, and red color channels separately and using the gradient orientation of the channel whose magnitude is the largest.

In still another embodiment, the hand tracking application configures the processor to utilize an operator selected from the group consisting of the Sobel, Scharr, Roberts, Prewitt, Laplacian of Gaussian, and difference of Gaussians operators to approximate image gradient orientation based upon intensity values within at least a 3×3 region surrounding a pixel.

In a yet further embodiment, the region is a 3×3 region or a 5×5 region.

In yet another embodiment, the hand tracking application configures the processor to search the frame of video data (I) for a grouping of pixels that have image gradient orientations that match a given edge feature template ($\mathcal{J}$) from the plurality of edge feature templates by determining whether the similarity of a number of gradient orientations extracted from the given edge feature template at a list P of locations r to be considered from edge features ($\mathcal{O}$) in the given edge feature template and image gradient orientations extracted from the frame of video data relative to a pixel location c exceed a predetermined matching threshold using the following similarity measure:

$$\mathcal{E}(I, \mathcal{J}, c) = \sum_{r \in P} \left( \max_{t \in R(c+r)} |\cos(ori(\mathcal{O}, r) - ori(I, t))| \right)$$

where $$R(c+r) = \left[ c+r-\frac{T}{2}, c+r+\frac{T}{2} \right] \times \left[ c+r-\frac{T}{2}, c+r+\frac{T}{2} \right]$$

defines a predetermined neighborhood of size T centered on the pixel location c+r within the frame of video data.

In a further embodiment again, the hand tracking application configures the processor to quantize the image gradient orientations into a predetermined number ($n_o$) of values that can each be represented by a single bit.

In another embodiment again, the hand tracking application configures the processor to calculate the similarity measure by spreading the quantized image gradient orientation at pixel location t (ori(I,t)) in a T×T window around the pixel location t and encoding the spread image gradient orientations using a binary string of length $n_o$, where each bit in the string corresponds to each quantized image gradient orientation present in the T×T window.

In a further additional embodiment, the hand tracking application configures the processor to: precompute lookup tables of $\max_{t \in R\ (c+r)} |\cos(ori(\mathcal{O},r)-ori(I,t))|$ for each possible orientation ori($\mathcal{O}$,r) of an edge feature at a given pixel location t in the video image data; and evaluate the similarity measure for the given edge feature template using the precomputed lookup tables.

In another additional embodiment, $n_o$ is between 5 and 8 and T is between 4 and 10.

In a still yet further embodiment, $n_o$=8 and T=5.

In still yet another embodiment, the hand tracking application determines the pixel locations (c) searched within the frame of video data using information including the pixel location of a previously identified finger.

In a still further embodiment again, the hand tracking application determines the pixel locations searched within the reference frame of video data using information including the rotation of the edge feature template from the plurality of edge feature templates that matched of a previously identified finger.

In still another embodiment again, the hand tracking application determines the pixel locations searched within the reference frame of video data using information including the scaling of the edge feature template from the plurality of edge feature templates that matched of a previously identified finger.

In a still further additional embodiment, the hand tracking application determines the pixel locations (c) searched using information further comprising the velocity of a previously identified finger.

In still another additional embodiment, the hand tracking application configures the processor to: detect the presence and initial location of at least one finger by recognizing an initialization gesture; and determine the pixel locations (c)

searched within the frame of video data using information including the initial location of the at least one finger.

In a yet further embodiment again, the memory contains video data of a previous frame, and the hand tracking application configures the processor to determine the pixel locations (c) searched within the frame of video data using information including pixels in the frame of video data that have changed relative to the pixels in the video data of the previous frame.

In yet another embodiment again, the sequence of frames obtained from the reference camera comprises a previous frame and a successive frame, and the hand tracking application configures the processor to: compare the successive frame of video data to the previous frame of video data to identify moving pixels; and restrict the searching of the successive frame of video data for a grouping of pixels that have image gradient orientations that match one of the plurality of edge feature templates to at least one bounded region containing pixels within the successive frame of video data that are moving.

In a yet further additional embodiment, the hand tracking application configures the processor to identify moving pixels by comparing the successive frame of video data and the previous frame of video data to locate pixels having intensities that change from the previous frame to the reference frame by a predetermined amount.

In yet another additional embodiment, the memory contains data concerning a part of a hand detected in the previous frame of video data; and the hand tracking application configures the processor to restrict the searching of the successive frame of video data for a grouping of pixels that have image gradient orientations that match one of the plurality of edge feature templates to at least one bounded region containing pixels within the successive frame of video data that are moving and that are within a specific range of locations within the successive frame of video data determined using the data concerning a part of a hand detected in the previous frame of video data.

In a further additional embodiment again, the data concerning a part of a hand detected in the previous frame of video data obtained from the reference camera comprises at least one piece of data selected from the group consisting of: the location of the part of a hand detected in the previous frame of video data; the velocity of the part of a hand detected in the previous frame of video data; the orientation of the part of a hand detected in the previous frame of video data; and the distance from the reference camera to the part of a hand detected in the previous frame of video data.

Another additional embodiment again also includes an alternate view camera configured to capture an alternate view frame of video data corresponding to the successive frame of video data, where each frame of video data comprises intensity information for a plurality of pixels. In addition, the hand tracking application further configures the processor to: generate a depth map with respect to pixels in the successive frame of video data by performing a disparity search with respect to corresponding pixels in the alternate view frame of video data to determine distances to pixels within the successive frame of video data; and restrict the searching of the successive frame of video data for a grouping of pixels that have image gradient orientations that match one of the plurality of edge feature templates to at least one bounded region containing pixels within the successive frame of video data that are moving and that have corresponding distances that are within a specific range of distances from the reference camera.

In another further embodiment, the memory contains data concerning a part of a hand detected in the previous frame of video data; and the hand tracking application configures the processor to restrict the searching of the successive frame of video data for a grouping of pixels that have image gradient orientations that match one of the plurality of edge feature templates to at least one bounded region containing pixels within the successive frame of video data that are moving, that are within a specific range of locations within the successive frame of video data determined using the data concerning a part of a hand detected in the previous frame of video data and that have corresponding distances that are within a specific range of distances from the reference camera.

In still another further embodiment, the data concerning a part of a hand detected in the previous frame of video data obtained from the reference camera comprises at least one piece of data selected from the group consisting of: the location of the part of a hand detected in the previous frame of video data; the velocity of the part of a hand detected in the previous frame of video data; the orientation of the part of a hand detected in the previous frame of video data; and the distance from the reference camera to the part of a hand detected in the previous frame of video data.

In yet another further embodiment, the hand tracking application configures the processor to generate a confidence map with respect to the distances contained within the depth map.

In another further embodiment again, the hand tracking application configures the processor to determine the specific range of distances relative to the distance of the pixel that is closest to the reference camera within the depth map.

In another further additional embodiment, the at least one bounded region comprises a bounded region that encompasses the largest group of pixels within the successive frame of video data that satisfy criterion including that they are moving and within the specific range of distances from the reference camera.

In still yet another further embodiment, at least one bounded region comprises a bounded region that encompasses the union of all pixels within the successive frame of video data that satisfy criterion including that they are moving and within the specific range of distances from the reference camera.

Still another further embodiment again also includes an alternate view camera configured to capture sequences of frames of video data, where each frame of video data comprises intensity information for a plurality of pixels. In addition, the hand tracking application further configures the processor to: obtain a sequence of frames of video from the alternate view camera; and verify that a part of a human hand visible in the sequence of frames of video data obtained from the reference camera is part of a human hand by locating a grouping of pixels in the alternate view frame of video data that correspond to the part of a human hand.

In still another further additional embodiment, the hand tracking application configures the processor to locate a grouping of pixels in the alternate view frame of video data that correspond to the part of a human hand by searching along an epipolar line within the alternate view image for a grouping of pixels that have image gradient orientations that match one of the plurality of edge feature templates, where the epipolar line is defined by the relative location of the center of the reference camera and the center of the alternate view camera.

In yet another further embodiment again, the hand tracking application is configured to search along an epipolar line within the alternate view frame of video for a grouping of pixels that have image gradient orientations that match one of the plurality of edge feature templates by performing a search with respect to pixels within a predetermined margin relative to the epipolar line.

In yet another further additional embodiment, the hand tracking application is configured to search along an epipolar line within the alternate view frame of video for a grouping of pixels that have image gradient orientations that match one of the plurality of edge feature templates that is rotated and scaled within predetermined limits relative to the base template.

In another further additional embodiment again, the hand tracking application is configured to search along an epipolar line within the alternate view frame of video for a grouping of pixels that have image gradient orientations that match one of the plurality of edge feature templates that is rotated and scaled within permitted limits relative to the base template that are determined based upon the disparity between the grouping of pixels in the alternate view image and the candidate finger in the reference image.

In a further embodiment, the permitted rotation limits increase with increased disparity.

In another embodiment, the hand tracking application further configures the processor to determine permitted rotation limits based upon the rotation of the template that matched the candidate finger in the reference frame of video data, and the disparity using projective geometry.

In a still further embodiment, the hand tracking application further configures the processor to determine a permitted scale based upon the scale of the template that matched the candidate finger in the reference frame of video data.

In still another embodiment, the distance from the reference camera to the part of a human hand is determined based upon the disparity between the part of the human hand visible in the sequence of frames of video data obtained from the reference camera and the grouping of pixels in the frames of video data obtained from the alternate view camera that correspond to the part of the human hand.

In a yet further embodiment, wherein the hand tracking application is configured to search along the epipolar line within the alternate view frame of video to obtain disparity measurements with pixel precision.

In yet another embodiment, the hand tracking application is configured to perform a search along the epipolar line within the alternate view frame of video involving resampling the alternate view frame of video to obtain disparity measurements with sub-pixel precision.

In a further embodiment again, the hand tracking application is configured to rectify the alternate view frame of video relative to the reference frame of video.

In yet another embodiment again, the hand tracking application is configured to use calibration to perform rectification of pixels that lie in regions surrounding the epipolar line in the alternate view frame of video data to search for a grouping of pixels that have image gradient orientations that match one of the plurality of edge feature templates.

One embodiment of the method of the invention includes: obtaining a sequence of frames of video data from the reference camera; comparing successive frames of video data from the sequence of frames of video data for pixels that change from one frame to the next using a processor configured using a hand tracking application; determining whether any of the pixels that changed are part of a human hand visible in the sequence of frames of video data using the processor configured using the hand tracking application, where a part of a human hand is identified by searching the frame of video data for a grouping of pixels that have image gradient orientations that match the edge features of one of the plurality of edge feature templates; tracking the motion of the part of the human hand visible in the sequence of frames of video data using the processor configured using the hand tracking application; confirming that the tracked motion of the part of the human hand visible in the sequence of frames of video data corresponds to a predetermined initialization gesture using the processor configured using the hand tracking application; and commence tracking the human hand as part of a gesture based interactive session using the processor configured using the hand tracking application.

BRIEF DESCRIPTION OF DRAWINGS

FIG. 1 is a high level block diagram of a system configured to perform real-time tracking of human hands and provide a gesture based interactive user interface.

FIG. 2 is a high level block diagram of an image processing system in accordance with an embodiment of the invention.

FIG. 5 conceptually illustrates a template that can be used to perform template matching of human fingers when performing gesture identification in accordance with embodiments of the invention.

FIG. 7A conceptually illustrates quantization of image gradient orientations.

FIG. 7B conceptually illustrates detection of image gradient orientations.

FIG. 7C conceptually illustrates spreading image gradient orientations across a 3×3 neighborhood.

FIG. 7D conceptually illustrates the binary encoding of the spread gradient orientations at each location within the image.

DETAILED DESCRIPTION

Figure 3:
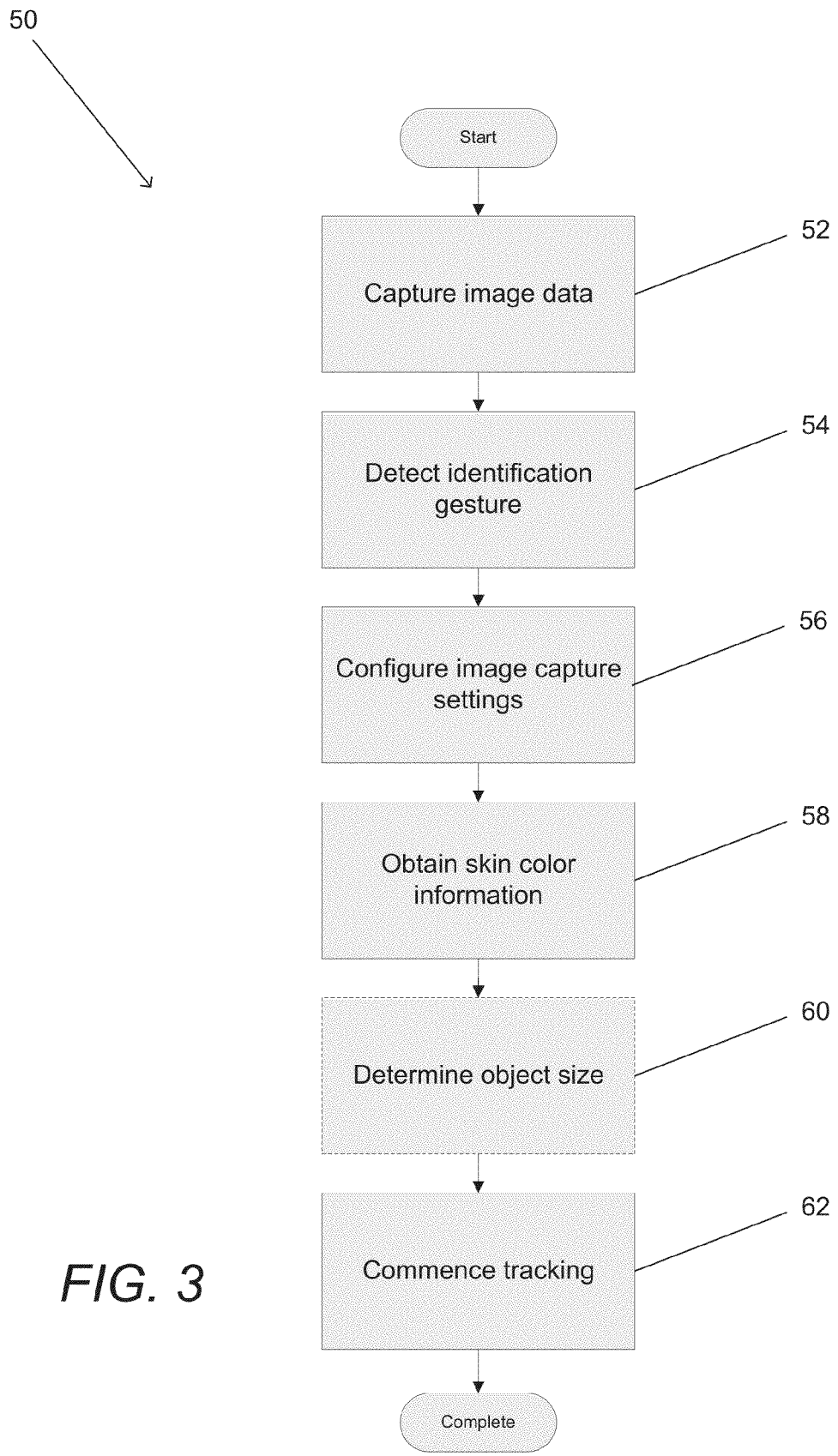
FIG. 3 is a flow chart illustrating a process for detecting an identification gesture and commencing tracking of a human hand in accordance with an embodiment of the invention.

Turning now to the drawings, systems and methods for initializing motion tracking of human hands in accordance with embodiments of the invention are illustrated. The tracking of fingers and hands can present particular challenges relative to conventional object detection, because hands typically do not include significant texture and are not rigid. Tracking of hands can be useful in enabling humans to interact with machines, such as (but not limited to) personal computers, tablet computers, smart phones, and consumer electronics devices including (but not limited to) televisions, disc players, set top boxes, and game consoles. In order to enable gesture based interaction with applications in real time, greater than real time performance can be demanded from hand tracking systems. The smaller the computational overhead of the hand tracking processes, the more computational power available for rich applications.

In many embodiments, the hand tracking system is part of a real-time gesture based interactive system including at least one camera configured to capture images of a scene. A real-time gesture based interactive system can enable a user to interact with a display device by pointing at the display device. Hand detection processes in accordance with many embodiments of the invention can be utilized to detect the location, and distance of the user's hand and the orientation of the user's finger as it is pointing at the display device. In a number of embodiments, the orientation of the finger is the 2D orientation of the detected finger within the captured image. In several embodiments, the orientation of the finger is the 3D orientation of the finger detected in the image relative to the camera and/or a display with which the user is interacting during a gesture based interactive session. The distance and orientation of the user's finger can be mapped to a location on a display device and a target overlaid on the display to provide visual feedback to the user. In this way, the user can move the target on the display and interact with a user interface by changing the orientation of the user's finger.

Tracked motion of a finger and/or gesture in 3D space can be mapped to a 2D space within a user interface presented on a display device. In several embodiments, another dimension such as (but not limited to) level of zoom, change of color, and/or speed can be used to perform the 3D mapping. In certain embodiments, an interaction zone is defined in 3D space and motion of a finger and/or gestures within a plane in the interaction zone parallel to the plane of the display can be utilized to determine the location on which to overlay a target on the display. A feature of hand tracking systems in accordance with many embodiments of the invention is that they can utilize a comparatively small interaction zone. In several embodiments, the interaction zone is a predetermined 2D or 3D space defined relative to a tracked hand such that a user can traverse the entire 2D or 3D space using only movement of the user's finger and or wrist. Utilizing a small interaction zone can enable a user to move a target from one side of a display to another in an ergonomic manner. Larger movements, such as arm movements, can lead to fatigue during interaction of even small duration. In several embodiments, the size of the interaction zone is determined based upon the distance of the tracked hand from a reference camera and the relative position of the tracked hand in the field of view. In addition, constraining a gesture based interactive session to a small interaction zone can reduce the overall computational load associated with tracking the human hand during the gesture based interactive session. When an initialization gesture is detected, an interaction zone can be defined based upon the motion of the tracked hand. In several embodiments, the interaction zone is defined relative to the mean position of the tracked hand during the initialization gesture. In a number of embodiments, the interaction zone is defined relative to the position occupied by the tracked hand at the end of the initialization gesture. In certain embodiments, the interaction zone is a predetermined size. In many embodiments, the interaction zone is a predetermined size determined based upon human physiology. In several embodiments, the interaction zone corresponds to a 3D that is no greater than 160 mm×90 mm×200 mm. In certain embodiments, the size of the interaction zone is determined based upon the scale of at least one of the plurality of templates that matches a part of a human hand visible in a sequence of frames of video data captured during detection of an initialization gesture and the distance of the part of the human hand visible in the sequence of frames of video data from the camera used to capture the sequence of frames of video data. In a number of embodiments, the size of the interaction zone is determined based upon the region in 3D space in which motion of the human hand is observed during the initialization gesture. In many embodiments, the size of the interaction zone is determined based upon a 2D region within a sequence of frames of video data in which motion of the part of a human hand is observed during the initialization gesture. In systems that utilize multiple cameras and that define an interaction zone that is a 3D space, the interaction zone can be mapped to a 2D region in the field of view of each camera. During subsequent hand tracking, the images captured by each camera can be cropped to the interaction zone to reduce the number of pixels processed during the gesture based interactive session. Although specific techniques are discussed above for defining interaction zones based upon hand gestures that do not involve gross arm movement (i.e. primarily involve movement of the wrist and finger without movement of the elbow or shoulder), any of a variety of processes can be utilized for defining interaction zones and utilizing the interaction zones in conducting gesture based interactive sessions as appropriate to the requirements of specific applications in accordance with embodiments of the invention.

A variety of gestures can be utilized within an interaction zone. For example, in a number of embodiments motion of the tip of a finger within a 2D plane can be used to determine the amount to move a target on a display. In several embodiments, the 3D orientation of the finger can be used to identify a location on a display at which a user's finger is pointing. Accordingly, in certain embodiments a target is moved on the display based upon the direction in which the user's finger is pointing. In other embodiments, any of a variety of techniques can be utilized to map the orientation of one or more detected fingers to locations on a display as part of a gesture based interactive session. In a number of embodiments, the tracked motion in three dimensional space (potentially within an interaction zone) is also mapped to events supported by the operating system including (but not limited to) mouse or pen events. In many embodiments, specific static and/or dynamic gestures can be identified and adapter software running on the real-time gesture based interactive system can map specific static and/or dynamic gestures to a particular defined action within an interactive application. Additional information concerning the manner in which gestures can be utilized to drive interactivity in real-time gesture based interactive systems is disclosed in U.S. application Ser. No. 13/757,705 entitled "Method and System Enabling Natural User Interface Gestures with an Electronic System" filed Feb. 1, 2013, the disclosure of which is incorporated by reference herein in its entirety.

User interaction with a real-time gesture based interactive system may not be continuous. In addition, observed user hand motion may be unrelated to interacting with the real-time gesture based interactive system. In many embodiments, the real-time gesture based interactive system continuously monitors the scene to detect a predetermined initialization or "wake up" gesture. The initialization gesture indicates that the user is commencing interaction with the real-time gesture based interactive system. In many embodiments, the real-time gesture based interactive system responds to detection of an initialization gesture by configuring the image capture settings of the camera and sampling the observed skin color of the surface of the detected human hand for use in subsequent tracking of motion of the hand.

In several embodiments, the initialization gesture is detected by monitoring images of a scene captured by at least one camera for pixel motion. When pixel motion is detected, a template matching process is utilized to determine whether the moving pixels are part of a hand. When a template match is found within the image, then the motion of the object can be tracked to determine whether the tracked motion corresponds to a predetermined initialization gesture.

In a number of embodiments, template matching during initialization gesture detection involves utilizing a parts based approach to template matching in which the detection of individual fingers can be used to determine hand pose. In a number of embodiments, a template matching process is utilized that accounts for rotated and scaled fingers. In a number of embodiments, the template matching process utilizes image gradient orientations along edges of a finger template. Processes for parallelizing the matching of an image gradient orientation template against an image were recently described in Hinterstoisser et al., "Gradient Response Maps for Real-Time Detection of Texture-Less Objects" *IEEE Transactions on Pattern Analysis and Machine Intelligence* (2012), the disclosure of which is incorporated by reference herein in its entirety. Processes similar to those described in the Hinterstoisser et al. publication can be utilized to identify candidate fingers within a captured image of a scene with low computational overhead in real-time applications.

In a number of embodiments, image gradient orientation templates are generated based upon rotation and scaling of a synthetic template as opposed to using machine learning techniques and a set of training data to learn appropriate templates. Although templates learnt using such techniques can also be utilized. In several embodiments, the templates are stored in a data structure that includes metadata concerning the rotation and scaling applied to the synthetic template to obtain a given template within the data structure. In many embodiments, the data structure is constructed to enable rapid searching for templates generated using bounded rotation and scaling of a selected template within the data structure. As is discussed further below, the metadata describing the templates can be used to prune template matching searches and/or determine information based upon relative scale and/or orientation of various matched templates. In other embodiments, any of a variety of techniques can be utilized to generate a set of templates that can be utilized during template matching and any of a number of different data structures and/or metadata can be associated with the templates to facilitate real-time template matching.

In many embodiments, multiple cameras are utilized to capture multiple views of a hand. In several embodiments, image gradient orientation template matching is used to identify a candidate finger in a reference view and the matched template can be utilized to search for a corresponding view of the candidate finger in one or more of the alternate view images. In several embodiments, the search is bounded with respect to the epipolar line between the reference camera and the alternate view camera. In a number of embodiments, the search for a corresponding view of a detected finger in an alternate view image is restricted based upon templates corresponding to a predetermined degree of rotation relative to the template that matched the candidate finger in the reference image. In many embodiments, the search for a corresponding view of a detected finger in an alternate view image is restricted based upon templates corresponding to a predetermined degree of scaling relative to the template that matched the candidate finger in the reference image. Based upon the disparity between the detected fingers in each of the multiple views, the distance of the finger from each of the cameras can be determined. In a number of embodiments, the image processing system can generate a depth map and/or a depth map is received from the camera system that captures the reference image. Where a depth map is available, the process of validating the detection of a candidate finger in a reference image can utilize pixel depth information to further bound the search for a matching view of the finger. The depth information can be utilized to determine the disparity between the two views and a search conducted within a bounded region surrounding the anticipated location of the finger in the alternate view.

In several embodiments, the initialization gesture involves the user placing a hand or a finger in a location that is a known distance from at least one camera in the real-time gesture based interactive system. The scale of the template that matches the finger at the known distance can then be utilized to determine depth based upon the relative scaling of templates that match the finger during freeform finger tracking.

Systems and methods for detecting an initialization gesture in accordance with embodiments of the invention are discussed further below.

Real-Time Gesture Based Interactive Systems

A real-time gesture based interactive system in accordance with an embodiment of the invention is illustrated in FIG. 1. The real-time gesture based interactive system 10 includes an image processing system 12 configured to receive image data captured by at least one camera 14. In many embodiments, the real-time gesture based interactive system 10 processes the captured image data to determine the location and pose of a human hand. Based upon the location and pose of a detected human hand, the image processing system can detect gestures including an initialization gesture indicating that the user is commencing gesture based interaction with the system. Gestures can be static (i.e. a user placing her or his hand in a specific pose) or dynamic (i.e. a user transition her or his hand through a prescribed sequence of poses). Based upon changes in the pose of the human hand and/or changes in the pose of a part of the human hand over time, the image processing system can detect dynamic gestures. Although much of the discussion that follows focuses on initialization gestures made using human hands and human fingers, motion of any of a variety of objects in a predetermined manner can be utilized to initiate object tracking and gesture based interaction in accordance with embodiments of the invention. In a number of embodiments, the real-time gesture based interactive system 10 includes a display 18 via which the real-time gesture based interactive system can present a user interface to the user. By detecting gestures, the real-time gesture based interactive system can enable the user to interact with the user interface presented via the display.

As noted above, object detection of human hands can be challenging due to the fact that hands typically have very low texture and are not rigid. In several embodiments, the image processing system uses a parts based template matching process to detect individual fingers from which hand pose can be inferred. In a number of embodiments, a variety of templates are generated by rotating and scaling an edge template. Using template matching processes optimized for low computational load in real-time applications, the templates can be utilized to detect candidate fingers in one or more views of a scene. In several embodiments, the templates combine multiple template matching modalities including (but not limited to) using the image gradient orientations of the edge template and applying a skin color classifier to pixels on the surface of candidate fingers.

When a human hand is detected, and motion of the human hand is detected that corresponds to an initialization gesture, the image processing system can perform an initialization process in preparation for tracking the human hand during a gesture based interactive session with the user. In several embodiments, the initialization process includes (but is not limited to) configuring the image capture parameters of the cameras to obtain high contrast images and sampling the color of the surface of the detected hand to obtain skin color information that can be utilized during the subsequent tracking of the hand. In several embodiments, the initialization gesture involves the user placing his or her hand a known distance from at least one of the cameras in the real-time gesture based interactive system. In which case, the initialization process can record the scale of the template that matched the finger at the known distance for use in determining depth based upon the relative scaling of templates that match the finger during freeform finger tracking. In certain embodiments, the initialization gesture incorporates placing an object of a known size within the FOV of the camera in such a way that the finger is at the same distance from the camera as the known object. The size of the known object can be determined using a variety of techniques, and the size of template used to detect a hand or part of a hand during the initialization gesture can then be used to determine distance during freeform finger tracking. In other embodiments, any of a variety of initialization processes can be performed as appropriate to the requirements of specific applications.

Following detection of an initialization gesture, the image processing system can commence a gesture based interactive session by tracking the distance and orientation of the detected hand and overlaying a target on the display based upon the tracked distance and orientation.

As can readily be appreciated, the computational load of an initialization gesture detection process can impact the overall performance of the image processing system. The lower the computational load, the greater the resources available for the image processing system to execute rich interactive applications. Although a specific image processing system including two cameras is illustrated in FIG. 1, any of a variety of processing systems configured to capture image data from at least one view can be utilized as appropriate to the requirements of specific applications in accordance with embodiments of the invention. Image processing systems in accordance with embodiments of the invention are discussed further below.

Image Processing Systems

Image processing systems in accordance with embodiments of the invention can be implemented using a variety of software configurable computing devices including (but not limited to) personal computers, tablet computers, smart phones, embedded devices and consumer electronics devices such as (but not limited to) televisions, disc players, set top boxes, and game consoles. An image processing system in accordance with an embodiment of the invention is illustrated in FIG. 2. The image processing system 20 includes a processor 22 that is configured to communicate with a camera interface 24 and a display interface 26. The image processing system also includes memory, which can take the form of one or more different types of storage including semiconductor and/or disk based storage. In the illustrated embodiment, the processor 22 is configured using an operating system 30. Where the image processing system is part of an embedded system, the image processing system may not utilize an operating system. Referring back to FIG. 2, the memory 28 also includes a hand tracking application 32 and may include an interactive application 34. As is discussed further below, the hand tracking application can be utilized to process image data received via the camera interface 24 to identify hand gestures including initialization gestures and/or the orientation and distance of individual fingers. These hand gestures can be processed by the processor 22, which can detect an initialization gesture and initiate an initialization process. Following the completion of the initialization process, the processor can commence tracking hand gestures that enable the user to interact with a user interface generated by the operating system 34 and/or the interactive application 30.

In many embodiments, the processor receives frames of video via the camera interface 24 from at least one camera. The camera interface can be any of a variety of interfaces appropriate to the requirements of a specific application including (but not limited to) the USB 2.0 or 3.0 interface standards specified by USB-IF, Inc. of Beaverton, Oreg., and the MIPI-CSI2 interface specified by the MIPI Alliance. In a number of embodiments, the received frames of video include image data represented using the RGB color model represented as intensity values in three color channels. In several embodiments, the received frames of video data include monochrome image data represented using intensity values in a single color channel. In several embodiments, the image data represents visible light. In other embodiments, the image data represents intensity of light in non-visible portions of the spectrum including (but not limited to) the infrared near-infrared and ultraviolet portions of the spectrum. In certain embodiments, the image data can be generated based upon electrical signals derived from other sources including but not limited to ultrasound signals. In several embodiments, the received frames of video are compressed using the Motion JPEG video format (ISO/IEC JTC1/SC29/WG10) specified by the Joint Photographic Experts Group. In a number of embodiments, the frames of video data are encoded using a block based video encoding scheme such as (but not limited to) the H.264/MPEG-4 Part 10 (Advanced Video Coding) standard jointly developed by the ITU-T Video Coding Experts Group (VCEG) together with the ISO/IEC JTC1 Motion Picture Experts Group. In certain embodiments, the image processing system receives RAW image data. In several embodiments, the camera systems that capture the image data also include the capability to capture dense depth maps and the image processing system is configured to utilize the dense depth maps in processing the image data received from the at least one camera system. In several embodiments, the camera systems include 3D sensors that capture dense depth maps including (but not limited to) time-of-flight cameras.

In many embodiments, the display interface 26 is utilized to drive a display device that can be integrated within the image processing system and/or external to the image processing system. In a number of embodiments, the HDMI High Definition Multimedia Interface specified by HDMI Licensing, LLC of Sunnyvale, Calif. is utilized to interface with the display device. In other embodiments, any of a variety of display interfaces appropriate to the requirements of a specific application can be utilized.

Although a specific image processing system is illustrated in FIG. 2, any of a variety of image processing system architectures capable of detecting initialization gestures and performing initialization processes to gather information for performing real-time hand tracking can be utilized in accordance with embodiments of the invention. Processes for detecting initialization gestures and performing initialization processes to gather information for performing real-time hand tracking in accordance with embodiments of the invention are discussed further below.

Processing for Initializing Hand Tracking

A process for initializing hand tracking in accordance with an embodiment of the invention is illustrated in FIG. 3. The process 50 includes capturing (52) image data using at least one camera and detecting (54) a gesture within the image data. In the event that an initialization gesture is detected, the real-time gesture based interactive system can perform an initialization process that can include (but is not limited to) configuring (56) image capture settings on at least one camera used to capture image data for tracking the detected object, and/or obtaining (58) skin color information that can be utilized in a skin color classifier in the tracking of the detected object. In several embodiments, the initialization gesture involves the user placing his or her hand and/or finger(s) a known distance from one or more cameras in the real-time gesture based interactive system. In this way, the size of the user's hand and/or finger(s) can be determined (60) and utilized to estimate depth during subsequent tracking. Using information obtained during the initialization process the real-time gesture based interactive system can track the user's hand during a gesture based interactive session.

Although specific processes for initializing hand tracking in accordance with an embodiment of the invention are discussed above with respect to FIG. 3, any of a variety of processes for detecting an initialization gesture and collecting information that can be utilized to perform hand tracking can be utilized as appropriate to the requirements of a specific application in accordance with an embodiment of the invention. Processes for detecting initialization gestures in accordance with embodiments of the invention are discussed further below.

Detecting Initialization Gestures

Processes for initializing hand tracking in accordance with embodiments of the invention can involve capturing a sequence of image data and detecting moving pixels within the sequence of image data. When any of the moving pixels correspond to an object that can be tracked by the real-time gesture based interactive system such as (but not limited to) a hand or a finger, then the object can be tracked to determine whether the object is tracing a trajectory corresponding to an initialization gesture.

Figure 4A:
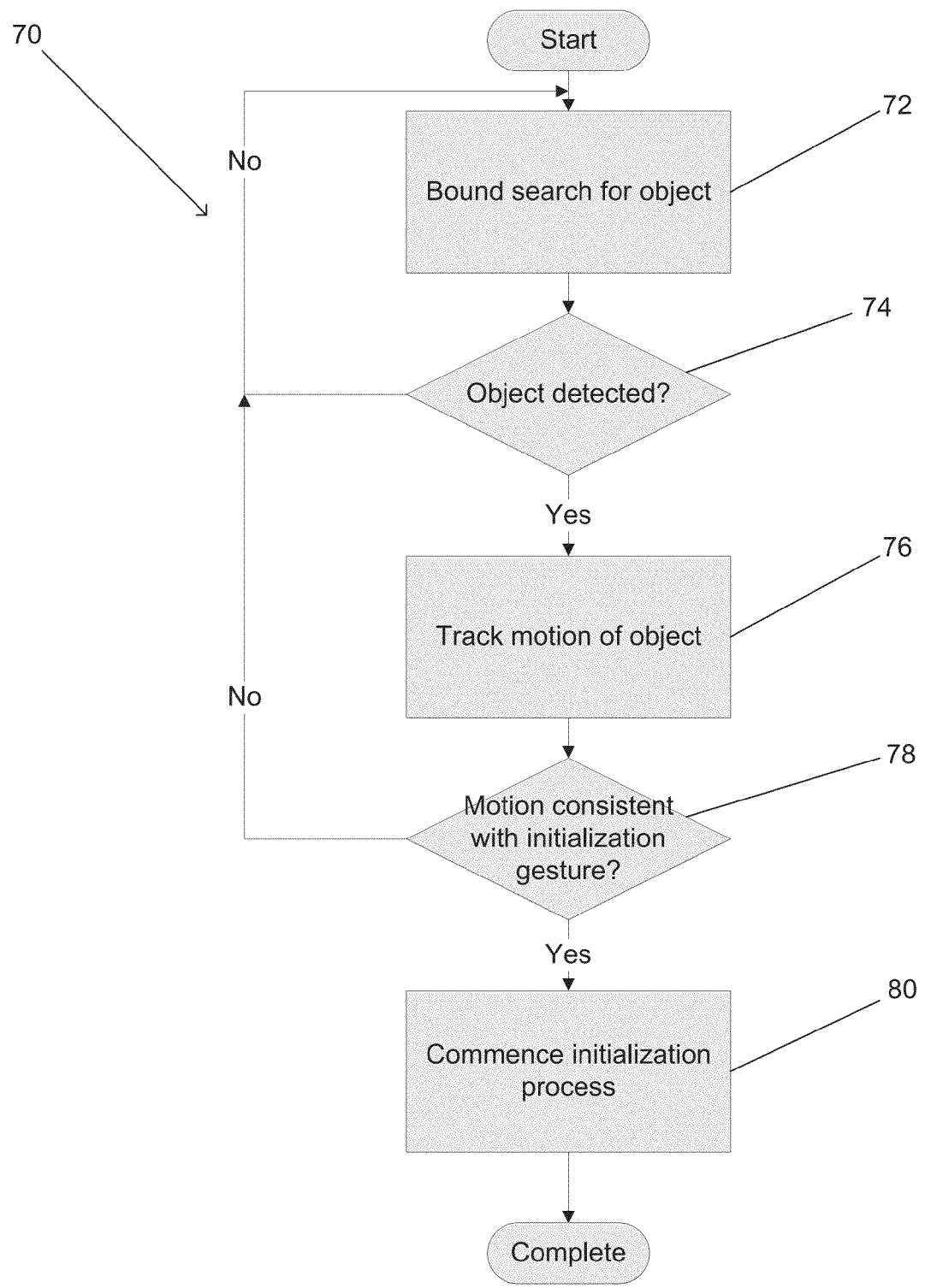
FIG. 4A is a flow chart illustrating a process for detecting an identification gesture in accordance with an embodiment of the invention.

A process for detecting an initialization gesture in accordance with an embodiment of the invention is illustrated in FIG. 4A. The process 70 includes bounding (72) the region of the captured image in which to conduct a search for an object. In several embodiments, images can be captured from one or more views over time. As is discussed further below, images captured over time can be utilized to identify motion within a scene and images captured from different viewpoints can be utilized to determine distance to objects within the scene. A search for an object within a scene, such as a part of a human hand, using template matching can be bounded (72) using information including (but not limited to) information concerning motion within the scene, depth of objects within the scene, and the location, distance, velocity, and/or orientation of the object in previously captured images of the scene. Template matching can then be performed with respect to a subset of pixels and/or one or more bounded regions to determine (74) whether an object such as (but not limited to) a human hand and/or finger is moving within the scene. In circumstances where the computational effort in identifying the subset of pixels and/or the one or more bounded regions in which to search is less than the effort to perform template matching with respect to the pixel locations eliminated during the bounding process, then the bounding process effectively accelerates the overall template matching process.

In the event that an object such as (but not limited to) a human hand and/or finger is detected, then its motion is tracked (76). Based upon the trajectory of the motion, a determination (78) can be made concerning whether the motion is consistent with an initialization gesture. When an initialization gesture is detected, an initialization process can commence (80). In many embodiments, the initialization gesture is a finger oscillating from side to side within a predetermined gesture range. In several embodiments, the initialization gesture is defined so that the user's hand has motion below a predetermined threshold while a finger is oscillating from side to side within a predetermined gesture range. In a number of embodiments, the initialization gesture is defined in such a way that the motion of the user's hand is consistent with motion of one or more of the user's fingers. In other embodiments, an initialization gesture can be any gesture capable of being tracked by an image processing system including (but not limited to) specific gestures where a user's hand and/or finger is oriented toward a specific location on a display and/or user's hand and/or finger orientation changes during the initialization gesture so as to point and/or gesture toward the display in a manner satisfying a predetermined criterion and/or any user defined initialization gesture. When an initialization gesture is not detected, the process continues to iterate until an initialization process is detected.

In a number of embodiments, pixel motion can be detected using any of a variety of techniques including but not limited to subtracting successive pairs of frames of video to identify pixel value differences exceeding a predetermined threshold. In other embodiments, any of a variety of techniques for efficiently detecting pixel motion can be utilized as appropriate to the requirements of specific applications.

As noted above, a template matching process can be applied to moving pixels to determine the presence of a hand. In many embodiments, the template matching process is a parts based template matching process that can be used to identify individual fingers. In several embodiments, hand pose can be inferred based upon identified fingers. In many embodiments, the template matching process utilizes a template similar to the template illustrated in FIG. 5. The illustrated template 90 defines an edge 92 and pixel locations corresponding to an object surface 94. The edge 92 can be utilized to perform edge detection using techniques including (but not limited to) the image gradient orientation technique disclosed in the Hinterstoisser et al. publication. The pixel locations corresponding to an object surface 94 can be utilized to collect skin color information for use by a skin color classifier during object tracking. Although a specific template is illustrated in FIG. 5, any of a variety of templates can be utilized to identify parts of a human hand including (but not limited to) fingers in accordance with embodiments of the invention.

In order to perform template matching, various versions of the template can be generated and stored in a data structure that can be rapidly traversed and pruned during the template matching search. In several embodiments, the set of templates that is used to perform template matching is generated through rotation and scaling of a basic template. In other embodiments, a single template can be utilized and the image in which the search is being conducted can be scaled and/or rotated to normalize the object size within the image. The basic template can be a synthetic shape chosen based upon template matching performance (as opposed to a shape learnt by analysis of images of fingers). By application of appropriate rotation and scaling, the template matching process can limit the impact of variation in size, orientation, and distance of a finger from the camera(s) on the ability of the image processing system to detect the finger. Specific processes that can be utilized to perform template matching when tracking an initialization gesture in accordance with embodiments of the invention are discussed further below.

Bounding Searches

When an image processing system receives a sequence of frames of video data captured from a single viewpoint, then motion between successive frames of video data captured from the viewpoint can be utilized to identify pixels that could correspond to an object being searched for within the scene. In a number of embodiments, an image processing system receives images of a scene captured from multiple viewpoints. By performing a disparity search between a reference viewpoint and one or more alternate viewpoints, a dense depth map of the scene can be generated. A dense depth map can be contrasted with using disparity to measure the distance between two groups of pixels identified in a reference frame and an alternate view frame using template matching. A dense depth map provides depth information with respect to an image captured from a reference viewpoint and is not limited to determining the depth of a single previously detected object within the scene. A dense depth map can be utilized to identify pixels that could correspond to a candidate object. A dense depth map can also be obtained using depth or 3D sensors such as, but not limited to, a time-of-flight camera. In many embodiments, motion data is utilized to generate a motion mask (i.e. a bitmap indicating pixels that change between successive frames) and the motion mask can be applied to the depth map to provide information concerning the distance to objects that are moving within the scene. Utilizing information concerning depth, and/or motion, an image processing system can identify a subset of pixels within a captured image and/or a bounded region within a scene to search when performing template matching. In many embodiments, information concerning motion and/or depth is supplemented with information including the location, velocity, distance, and/or orientation of an object detected in a previously captured image of the scene when identify a subset of pixels within a captured image to search during template matching.

Figure 4B:
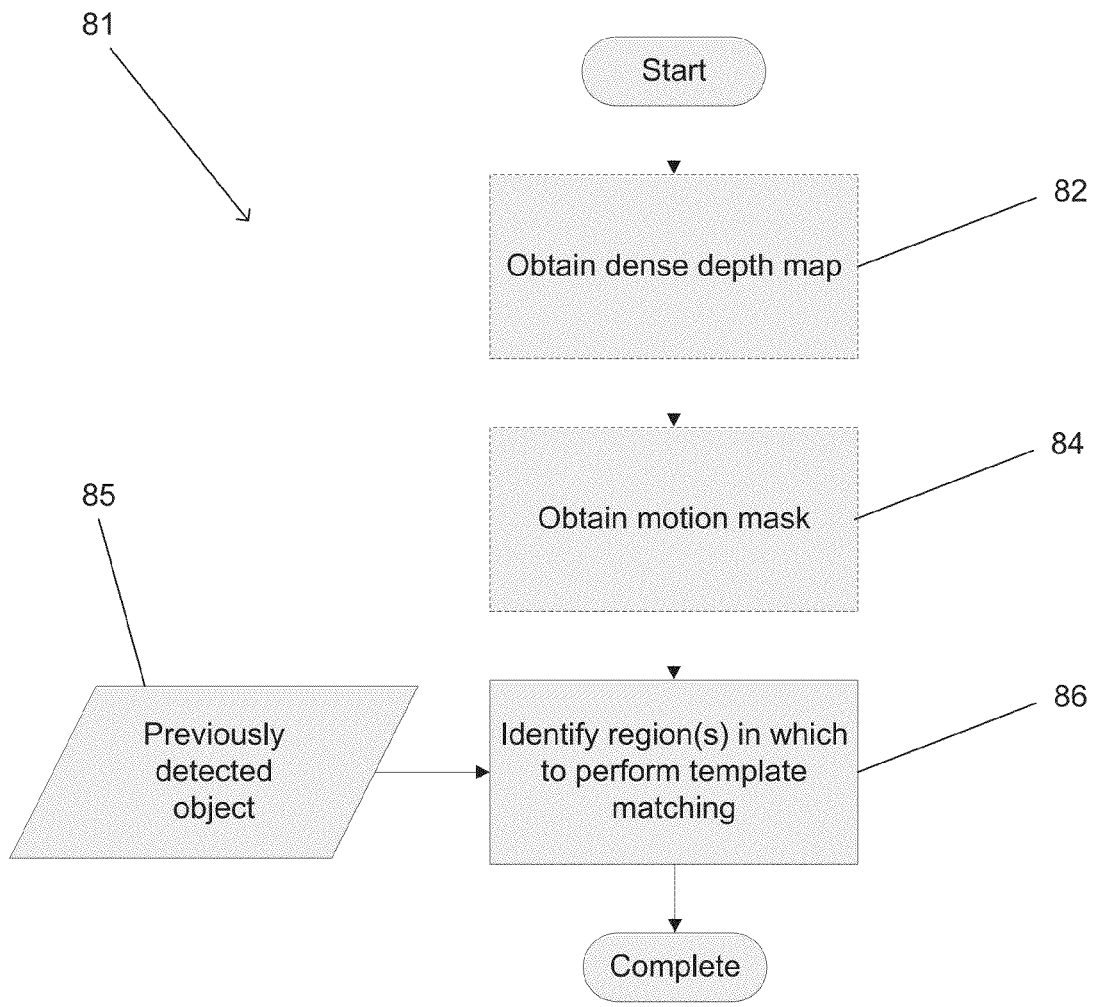
FIG. 4B is a flow chart illustrating a process for bounding the pixels within an image that are searched using template matching in order to identify an object in accordance with an embodiment of the invention.

A process to identify a subset of pixels within a captured image to search when performing template matching in accordance with an embodiment of the invention is illustrated in FIG. 4B. The process 81 includes obtaining a dense depth map (82) and/or a motion mask (84) with respect to a captured image of a scene. Information concerning motion and distance can be combined with data (85) concerning an object detected in a previous frame of video captured from the viewpoint including (but not limited to) pixel location(s), velocity, distance, and/or orientation of the previously detected object. An image processing system can utilize the available information to identify (86) regions in which to perform template matching. As is discussed further below, any of a variety of predetermined criterion can be utilized to identify regions in which to perform template matching.

In several embodiments, a dense depth map is obtained by capturing at least one alternate view of the scene and using disparity between the reference view and the alternate view(s) to determine distance to objects visible in the scene. In many embodiments, the process of generating the depth map can also include the generation of a confidence map that provides information concerning the reliability of a particular depth measurement and the confidence map can be considered in determining whether to exclude specific pixels based upon the corresponding depth of the pixels. In many embodiments, a depth map is obtained using a depth or 3D sensor such as (but not limited to) a time-of-flight camera.

In a number of embodiments, pixel motion can be detected using any of a variety of techniques including but not limited to subtracting successive pairs of frames of video to identify pixel value differences exceeding a predetermined threshold. In other embodiments, any of a variety of techniques for efficiently detecting pixel motion can be utilized as appropriate to the requirements of specific applications.

When a depth map and a motion mask are available, the motion mask can be applied to the depth map using a binary AND operation to yield a depth map that only shows depth information for pixels that are moving. Any of a variety of predetermined criterion can then be utilized to identify one or more regions to search when performing template matching. In several embodiments, the image processing system determines the pixels to search based upon the closest moving pixel(s) in the image captured of the scene. In certain embodiments, all (moving) pixels within a predetermined distance of the closest moving pixel(s) are identified. In a number of embodiments, a bounded region in which to conduct a search when performing template matching can be selected as a region that encompasses at least one of: the largest group of identified pixels; the union of all the identified pixels; or groups of identified pixels that are likely to correspond to a feature of the object such as (but not limited to) a pointing finger. To identify a region containing a pointing finger, in some embodiments the topmost portion of a previously identified bounded region is selected. In other embodiments, the 3D shape of the extracted region is searched for a subset of 3D points that forms a relatively (with respect to the full shape) narrow, elongated, straight structure. Additional information concerning the locations in which objects have previously been detected in the scene can also be utilized to select identified pixels.

Although specific processes for reducing the number of pixels that are searched when performing template matching are described above with respect to FIG. 4B, any of a variety of techniques can be utilized to reduce the number of pixels that are considered when performing template matching as appropriate to the requirements of specific applications in accordance with embodiments of the invention. Furthermore, template matching can also be performed without directly limiting the pixels that are searched. An image can simply be captured and a search can be performed until a predetermined number of object(s) is detected with respect to pixels searched in an order that may be informed by information concerning the location, distance, velocity, and/or orientation of object(s) detected in previous frames of video data. Processes for performing template matching in accordance with embodiments of the invention are discussed further below.

Finger Detection Using Image Gradient Orientation Template Matching

From the perspective of machine vision, hands are characterized by low texture and a lack of rigidity. As noted above, hand pose can be determined by decomposing hands into parts. The parts of a hand that can typically provide the greatest information concerning hand pose are the articulated joints and specifically the fingers. Therefore, by performing finger tracking, information can be obtained concerning the pose and orientation of individual fingers and the overall pose and orientation of a human hand. As noted above, template matching processes involving performing image gradient orientation matching can be efficiently implemented to achieve real time performance. Use of a single synthetically generated template similar to the template described above with reference to FIG. 5 to generate a set of scaled and rotated templates that are searched during template matching can greatly reduce computational complexity by reducing the number of templates considered during the template matching process relative to a process that utilizes multiple different templates corresponding to different real world finger types obtained using a machine learning technique based upon a training data set of images of fingers as the basis for generating a database of scaled and rotated finger templates. In other embodiments, any of a variety of template matching processes including (but not limited to) image gradient magnitude matching involving a binary mask of the edges of an object silhouette can be utilized as appropriate to the requirements of specific applications. In several embodiments, templates such as, but not limited to, binary masks of the edges of an object silhouette can similarly accommodate uncertainty through the spreading of the mask into a region of neighboring pixels.

In several embodiments, the process of performing image gradient orientation matching involves using a similarity measure that, for each gradient orientation on a template, searches in a neighborhood of the associated gradient location for the most similar orientation within the image of the scene. The term image gradient is typically used to refer to a directional change in the intensity or color of an image. In many applications, the Sobel operator is used to approximate image gradient based upon intensity values within a 3×3 region surrounding a pixel. In other instances, any of a variety of techniques can be utilized to determine image gradient including but not limited to the use of the Scharr, Roberts, Prewitt, Laplacian of Gaussian (LoG), and/or difference of Gaussian (DoG) operators. Image gradients are typically highly discriminating and invariant to illumination change and noise when utilized in template matching applications. Image gradients are also a reliable image cue with respect to texture-less objects such as hands. Considering only the orientation of the gradients and not their norms makes the measure robust to contrast changes, and taking the absolute value of cosine between them provides a similarity measure that can tolerate object occlusion boundaries. Furthermore, template matching performance is largely unaffected by background brightness.

In many embodiments, robustness is increased by computing the orientation of gradients in the Red and Green color channels of the input image separately and for each image location using the gradient orientation of the channel whose magnitude is the largest. Given an RGB color image I, the gradient orientation map $I_\theta(x)$ at location x can be computed as follows:

$$I_\theta(x) = ori(I_{\hat{C}}(x))$$

where $$\hat{C} = \underset{C \in \{R,G\}}{\mathrm{argmax}} \left\| \frac{\partial I_c}{\partial x} \right\|$$

and R, G are the Red and Green channels of the corresponding color image.

Use of the Red and Green channels only from RGB image data can facilitate detection of skin colored objects using gradient image orientation. In several embodiments, the Blue color channel can also contain useful information and the gradient orientation map can be determined based upon the gradient orientation of the image gradient in each of the Red, Green, and Blue color channels that has the largest magnitude.

A template $\mathcal{T}$ can be defined using a list P of locations r to be considered from the template image $\mathcal{O}$. The locations r can be defined in terms of shifts from a pixel location in the image c. As noted above, the pixels c searched can be pixels that have moved or that are in regions related to the size of the template and defined relative to a pixel that has moved. When performing template matching, the similarity of a number of gradient orientations extracted from a template $\mathcal{T}$ and gradient orientations extracted from an image I of a scene can be evaluated using the following expression:

$$\mathcal{E}(I, \mathcal{T}, c) = \sum_{r \in P} \left( \max_{t \in R(c+r)} |\cos(ori(\mathcal{O}, r) - ori(I, t))| \right)$$

where $$R(c+r) = \left[c+r-\frac{T}{2}, c+r+\frac{T}{2}\right] \times \left[c+r-\frac{T}{2}, c+r+\frac{T}{2}\right]$$

defines the neighborhood of size T centered on location c+r in the input image.

Figure 6:
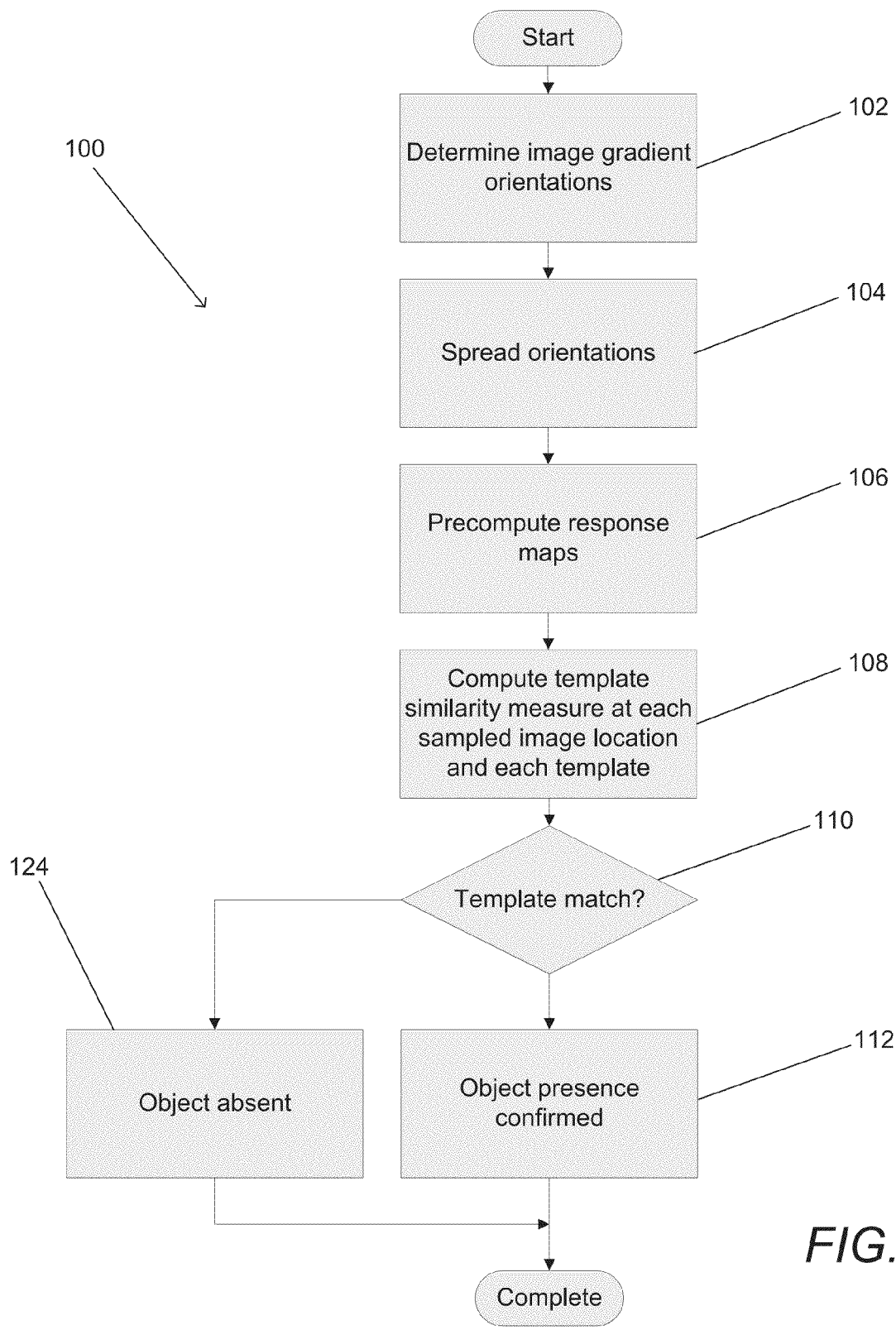
FIG. 6 is a flow chart illustrating a process for performing template matching using image gradient orientations in real time.

An efficient process for performing image gradient orientation template matching in accordance with an embodiment of the invention is illustrated in FIG. 6. The process 100 includes determining (102) image gradient orientations for pixel locations within an image. The image gradient orientations can be quantized into a small number $n_o$ of values. The quantization of image gradient orientations is conceptually illustrated in FIG. 7A. The image gradient orientations ori(I,t) can then be spread (104) in a T×T window around their locations. The process of spreading the image gradient orientations 122 in the image 124 shown in FIG. 7B is illustrated in FIG. 7C. The image gradient orientation 126 is spread to adjacent pixels in a 3×3 window 128. As can readily be seen, the image gradient orientation 01000 (126) is spread to a neighboring pixel location 130 to which the image gradient orientation 10000 is spread from a third neighboring pixel location 132.

For efficiency, the possible combination of image gradient orientations spread to a given image location m can be encoded using a binary string of length $n_o$, where each bit in the string corresponds to a specific gradient orientation. As is discussed further below, these strings can be used as indices to access lookup tables for fast precomputation of the similarity measure. Binary representations of spread image gradient orientations are conceptually illustrated in FIG. 7D. The pixel location 130 from FIG. 7C to which both the image gradient 01000 and 10000 were spread is shown as having the binary representation of 11000 in the spread image gradient map 135 shown in FIG. 6D. Although FIGS. 6A-6D utilize five bits ($n_o$=5) to quantize image gradient orientations and spread the gradients in a 3×3 window of pixels (T=3), any value for $n_o$ and T can be utilized in accordance with embodiments of the invention. In a number of embodiments, $n_o$=8 and T=5. In several embodiments, VGA images are searched and $n_o$ is between 8 and T is between 4 and 10. In other embodiments, $n_o$ and T are selected as appropriate to the requirements of a specific application.

Using the binary representation, a template match can be computed very efficiently. The spread image gradient orientations in each pixel location can be utilized to precompute (106) response maps. In several embodiments, lookup tables can be used to precompute $\max_{t \in R(c+r)} |\cos(\text{ori}(\mathcal{O},r)-\text{ori}(I,t))|$ for each possible orientation $\text{ori}(\mathcal{O},r)$ in the template. In many embodiments, the computations are performed using a lookup table and a response map $S_i(c)$ is obtained for each of the $n_o$ quantized orientations.

The similarity of a given template to an image at a given pixel location within the image can be computed (108) using the precomputed similarity maps as follows:

$$\mathcal{E}(I, \mathcal{J}, c) = \sum_{r \in P} (S_{\text{ori}(O,r)}(c+r))$$

Since the maps $S_i(c)$ are shared between the templates, matching several templates against the input image can be done very fast once the maps are computed. At a given pixel location c the similarity of all templates can be determined and any templates exceeding a predetermined threshold (110) can be considered to indicate the presence (112) of a candidate finger. When no template matches are located with respect to moving pixels and/or pixels in regions surrounding moving pixels, the process 100 concludes that no fingers are present (124).

Although specific processes are described above with respect to FIGS. 6 and 7A-7D for identifying candidate fingers using image gradient orientation template matching, any of a variety template matching processes that are robust and capable of real-time performance can be utilized as appropriate to the requirements of specific applications in accordance with embodiments of the invention. Processes for confirming finger detection by applying skin color classifiers to candidate fingers identified using template matching are discussed further below.

Confirming Finger Detections Using Alternate Views

In a number of embodiments, the image processing system receives images of a scene captured from multiple viewpoints. A template matching process similar to the processes outlined above can be used to locate one or more candidate fingers in a reference image, and the finger detection can be confirmed by locating an alternate view of the candidate finger in one or more alternate images. The search for alternate views of the candidate finger can be guided by parallax.

Figure 8:
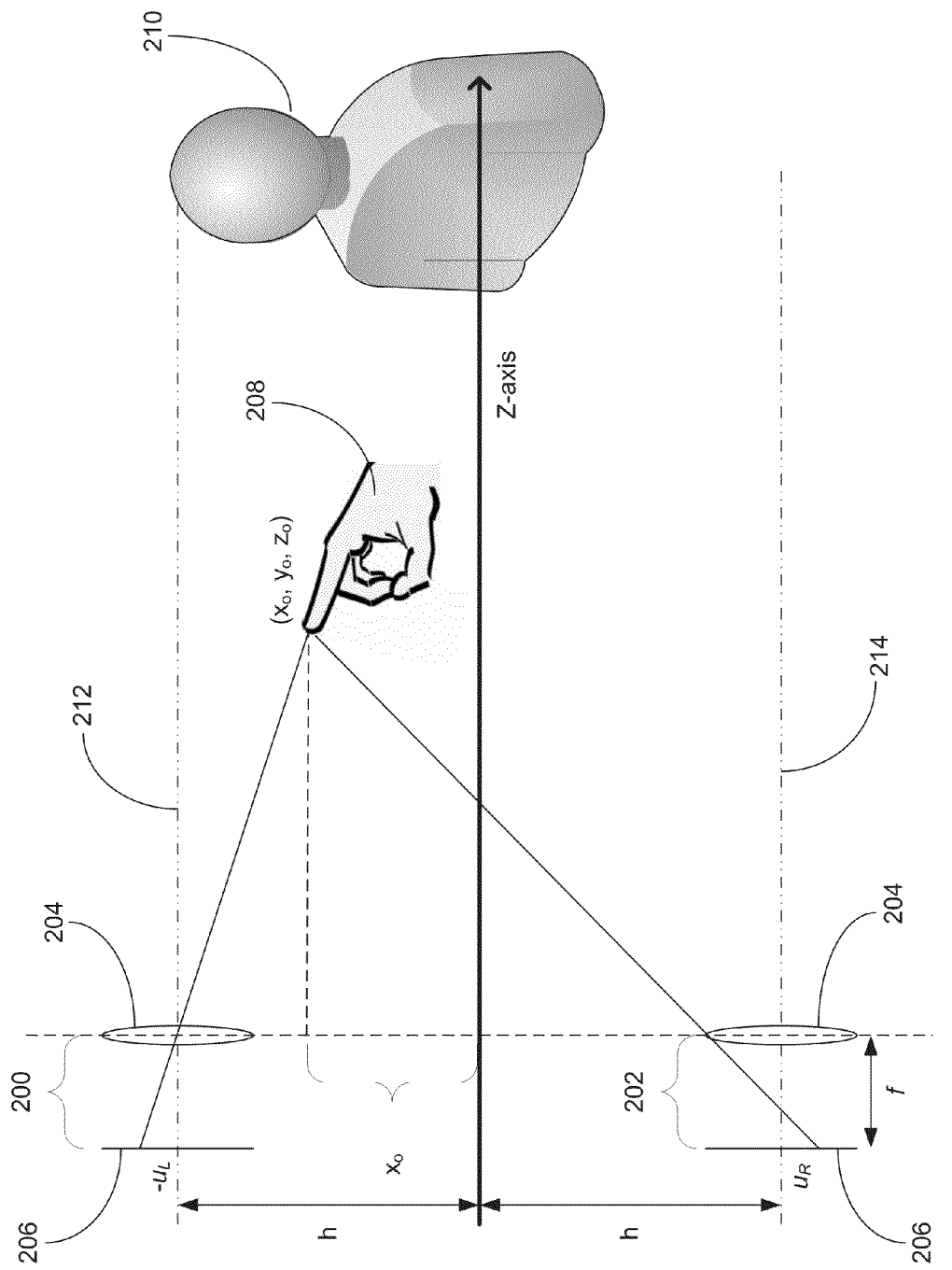
FIG. 8 conceptually illustrates capturing image data using a reference camera and an alternate view camera.
Figure 9:
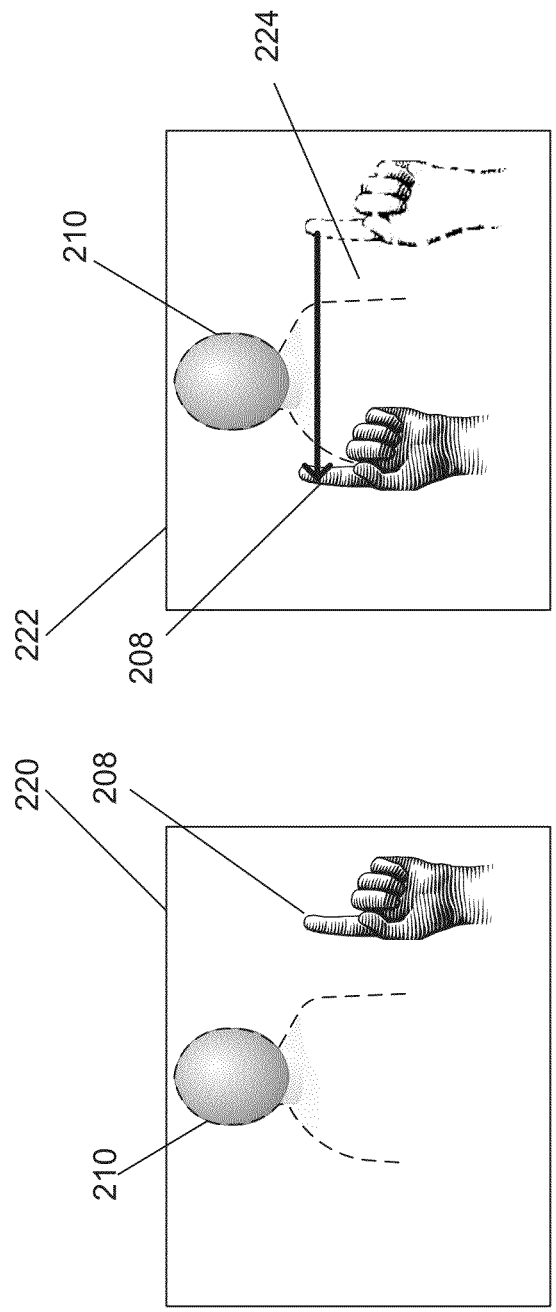
FIGS. 9A and 9B conceptually illustrate the effect of parallax in images of a scene captured by a reference camera and an alternate view camera.

Parallax in a two camera system is illustrated in FIG. 8. The two cameras 200, 202, include a lens stack 204 and a focal plane 206. Each camera has a back focal length f, and the two cameras are separated by the baseline distance of 2h. The field of view of both cameras encompasses a scene including a foreground object 208 (a finger) and a background object 210 (a torso). The scene from the viewpoint of the first camera 200 is illustrated in FIG. 9A. In the image 300 captured by the first camera, the foreground object 208 appears located slightly to the right of the background object 210. The scene from the viewpoint of the second camera 202 is illustrated in FIG. 9B. In the image 302 captured by the second camera, the foreground object 208 appears shifted to the left hand side of the background object 210. The disparity introduced by the different fields of view of the two cameras 200, 202, is equal to the difference in location of the foreground object 208 between its location in the image captured by the first camera (indicated in the image captured by the second camera by ghost lines 304) and its location in the image captured by the second camera. As is discussed further below, the distance from the two cameras to the foreground object can be obtained by determining the disparity of the foreground object in the two captured images.

Referring again to FIG. 8, the point $(x_o, y_o, z_o)$ on the foreground object will appear on the focal plane of each camera at an offset from the camera's optical axis. The offset of the point on the focal plane of the first camera 200 relative to its optical axis 212 is shown as $-u_L$. The offset of the point on the focal plane of the second camera 202 relative to its optical axis 214 is shown as $u_R$. Using similar triangles, the offset between the images captured by the two cameras can be observed as follows:

$$\frac{h - x_o}{z_o} = \frac{-u_L}{f}$$

$$\frac{h + x_o}{z_o} = \frac{u_R}{f}$$

Combining the two equations yields the disparity (or parallax) between the two cameras as:

$$\Delta_{\text{parallax}} = u_R - u_L = \frac{2hf}{z_o}$$

From the above equation, it can be seen that disparity between images captured by the cameras is along a vector in the direction of the baseline of the two cameras, which can be referred to as the epipolar line between the two cameras. Furthermore, the magnitude of the disparity is directly proportional to the baseline separation of the two cameras and the back focal length of the cameras and is inversely proportional to the distance from the camera to an object appearing in the scene.

In several embodiments, video data captured by a reference camera and alternate view cameras can be rectified to simplify the process of locating alternate views of a candidate finger by bounding the search to the epipolar line. Typically, a set of cameras can observe a maximum disparity (i.e. the closest distance at which an object can be resolved in multiple cameras) and a minimum disparity (i.e. the disparity for an object at infinity). When a candidate finger is located in a reference image, a search along the epipolar line from the minimum disparity to the maximum disparity can be used to locate an alternate view of the candidate finger and provide finger detection confirmation. A disparity search can be further bounded based upon a permitted minimum and maximum finger size. Effectively, a limit on the maximum disparity can be defined based upon the resulting detected finger being smaller than fingers observed in the human population. Similarly, a limit on the minimum disparity can be defined based upon the resulting detected finger being larger than fingers observed in the human population.

In many embodiments, the search is performed with respect to pixels within a predetermined margin relative to the epipolar line and with respect to templates that are rotated and scaled a predetermined amount relative to the template matching the candidate finger in a reference frame of video. In several embodiments, projective geometry is used to determine the permitted rotation of a template relative to template matching the candidate finger in a reference frame. Using projective geometry, the anticipated rotation of a candidate finger visible in a reference frame within an alternate view frame can be determined based upon the baseline between the reference view camera and the alternate view camera, the distance to the candidate finger, and the location of the candidate finger within the reference frame. Accordingly, as a search is performed the extent of the permitted rotation can vary with the disparity (i.e. distance along the epipolar line) between the pixel being considered by the template matching process and the position of the candidate finger in the reference frame of video. In many embodiments, the scale of the template matching the candidate finger in a reference frame of video is used to perform template matching. In a number of embodiments, additional templates corresponding to larger permitted rotations and/or scaling can be searched with increased disparity and/or offset relative to the center of an image captured by a reference camera to reflect the fact that appearance is likely to change dramatically from a reference view to an alternate view the closer a candidate finger is to the reference camera and further the candidate finger is from the center of the field of view of the reference camera. When an alternate view of a candidate finger is located in one or more alternate views, the disparity between the candidate finger in the different views can be used to determine the distance from the cameras to the detected finger.

Figure 10:
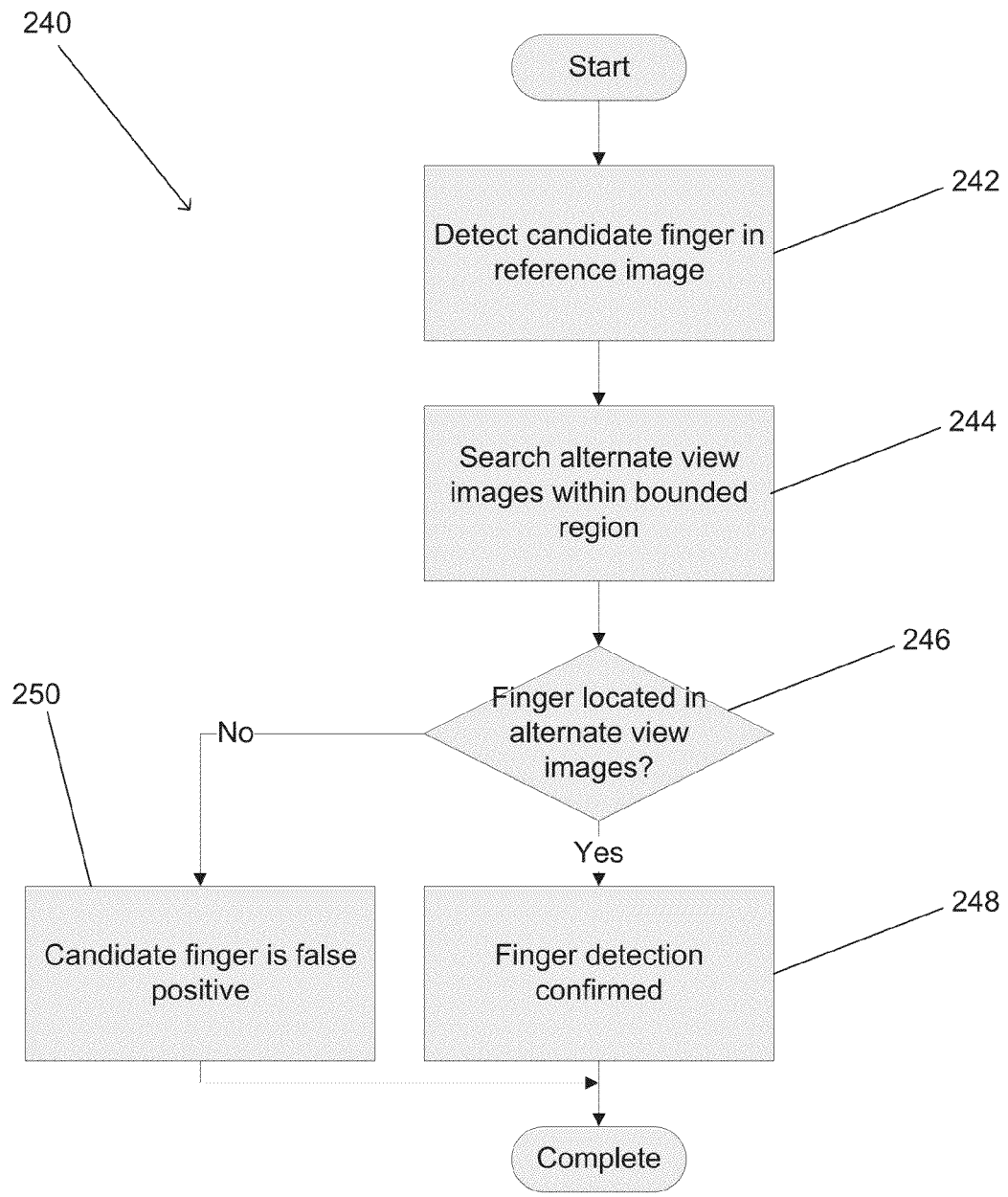
FIG. 10 is a flow chart illustrating a process for confirming finger detection using alternate view images in accordance with an embodiment of the invention.

A process for confirming detection of a candidate finger observed in a reference image using an alternate view image in accordance with an embodiment of the invention is illustrated in FIG. 10. The process 240 includes detecting (242) a candidate finger in a reference image. A search can then be conducted within (244) at least one alternate view image within a bounded region. The search region can be bounded spatially to accommodate uncertainty in the rectification of the two images and the location of the candidate finger within the reference image. The templates that can be utilized during the search can also be bounded based upon permitted rotation and scaling relative to the template that matched the candidate finger in the reference image. Processes for performing bounded searches along an epipolar line for alternate views of a candidate finger located in a reference image in accordance with embodiments of the invention are discussed further below. When the bounded search within the alternate view image(s) identifies (246) a template match, finger detection is confirmed (248) and the distance of the detected finger from the cameras can be determined based upon the disparity between the reference image and the alternate view image, the baseline between the reference camera and the alternate view camera, and the focal length of the cameras. When the bounded search along the epipolar line from the minimum disparity to the maximum disparity does not result in a template match, then the candidate finger is determined (250) to be a false positive.

As discussed above, the alternate view image can be rectified with respect to the reference image and a search conducted within a bounded region surrounding the epipolar line between the cameras. In several embodiments, a search is conducted with respect to pixels a predetermined distance from the epipolar line. In several embodiments, a search is conducted with respect to pixels a predetermined Manhattan distance from the epipolar line. The search can also be bounded with respect to the template. In several embodiments, the image processing system maintains metadata describing the scale and rotation of the template that matched the candidate finger in the reference image. In a number of embodiments, the search for an alternate view of the candidate finger along the epipolar line can involve performing template matching using a process similar to any of the processes outlined above but restricting the templates searched to templates that have a predetermined scale and rotation relative to the template that matched the candidate finger in the reference image. In several embodiments, the templates that are used when performing template matching can change with increased disparity to account for the increased change in orientation and scaling that may be observed in different views of an object as the object moves closer to the cameras.

Figure 11:
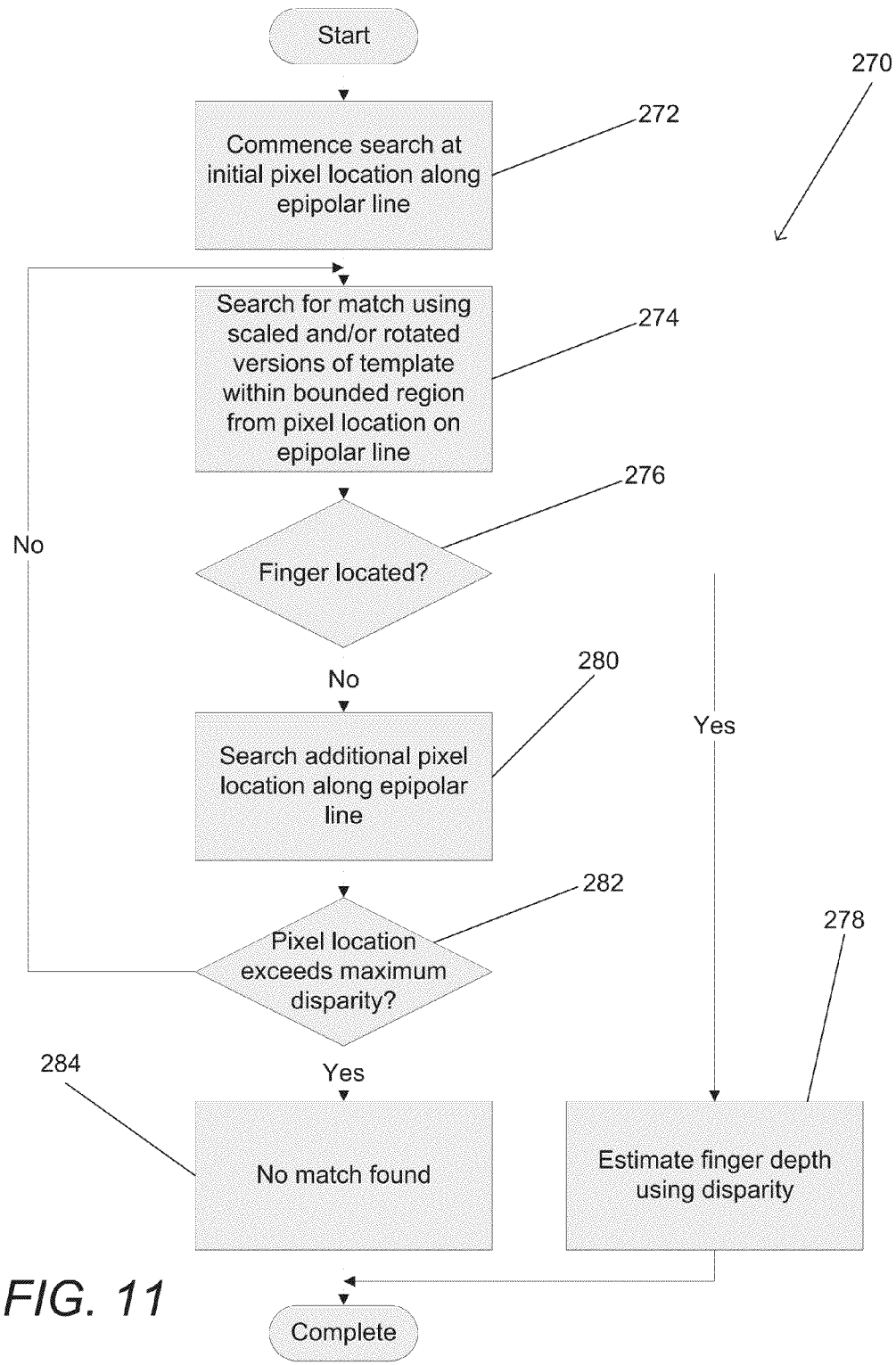
FIG. 11 is a flow chart illustrating a process for searching along an epipolar line within an alternate view image for a finger matching a template used to identify a candidate finger in a reference image in accordance with an embodiment of the invention.

A process for performing a bounded search for an alternate view of a candidate finger located using a template in a reference image by searching along an epipolar line in an alternate view image in accordance with an embodiment of the invention is illustrated in FIG. 11. The process 270 includes determining (272) an initial pixel location along the epipolar line at which to commence a search. The initial pixel location can be determined based upon the requirements of a specific application. Although the minimum disparity and maximum disparity are likely known, a candidate finger is likely to be a foreground object a minimum distance from the cameras. Accordingly, a disparity search can be conducted starting at the most likely distance and searching depths closer to and further from the initial distance. In several embodiments, the starting pixel is identified based upon a disparity corresponding to a previous depth estimate obtained while tracking a finger. In other embodiments, any of a variety of techniques can be utilized to rapidly search the epipolar line to locate an alternate view of a candidate image.

As described above, a bounded search can be performed (274) within a predetermined distance of the point along the epipolar line using a set of templates limited by rotation and scaling bounds relative to the template that matched the candidate finger in the reference image. In several embodiments, the bounds placed on rotation and/or scaling can be determined based upon disparity. The spatial, rotation, and scaling bounds are largely a function of the requirements of a specific application. If a template match is located (276), then the disparity can be used to estimate (278) the depth of a finger. If no template match is found, then the process 270 continues to iterate by selecting (280) additional pixel locations along the epipolar line and performing bounded searches (274) until the search is exhausted (282). In which case, the process 270 determines that the alternate view image does not contain an alternate view of the candidate finger suggesting that the candidate finger detected in the reference image is a false positive.

In many embodiments, the disparity search is performed with pixel precision. In several embodiments, additional depth estimation precision is desirable and the disparity search can be performed with sub-pixel precision by resampling the alternate view image to the appropriate sub-pixel position along the epipolar line.

In many embodiments, a dense depth map is available to the image processing system. The dense depth map can be utilized to determine the depth of a candidate finger and the anticipated disparity between the location of the candidate finger in a reference image and the location of the candidate finger in the alternate view image. The disparity can also inform the anticipated scaling and/or rotation of a template that would match an alternate view of the candidate finger based upon the template that matched the candidate finger in the reference view. In several embodiments, the template matching process described above is performed using template matching with respect to a dense depth map of the scene instead of or in addition to template matching with respect to an image of the scene. The dense depth map includes data similar to that of an image having a single color channel. Therefore, the gradient orientations of the dense depth map can be processed in a similar manner to the image gradient orientations of a monochrome image. A finger (or other object such as a different hand part) in the depth map will typically have the same gradient orientations as the gradient orientations within a monochrome or color image. Therefore, candidate fingers can be identified within a dense depth map of a scene using the same processes outlined above to match a set of templates against the image gradient orientations in a monochrome or color image of the scene.

Figure 12:
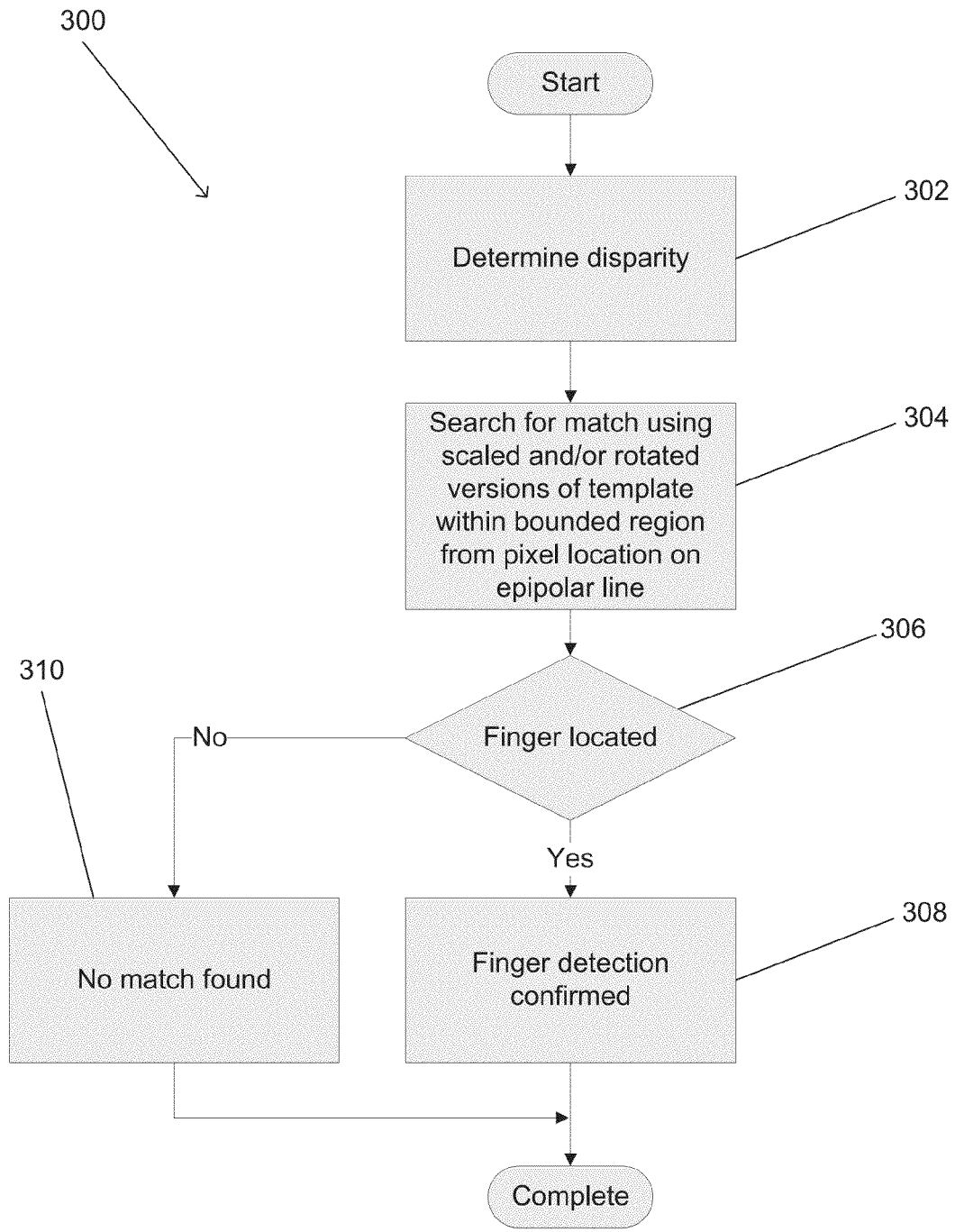
FIG. 12 is a flow chart illustrating a process for searching along an epipolar line within an alternate view image for a finger matching a template used to identify a candidate finger in a reference image based upon the depth of the candidate finger in the reference image in accordance with an embodiment of the invention.

A process for performing a bounded search of an alternate view image for an alternate view of a candidate finger identified using a template in a reference image based upon the depth of the candidate finger in accordance with an embodiment of the invention is illustrated in FIG. 12. The process 300 involves determining (302) the anticipated disparity between the location of the candidate finger in the reference image and the location of an alternate view of the candidate finger in an alternate view image. The anticipated disparity identifies a pixel location along the epipolar line and a bounded search can be performed within the region surrounding the pixel location to locate an alternate view of the candidate finger. As discussed above, the bounded search can involve searching pixel locations within a predetermined distance of the pixel location on the epipolar line and/or using a subset of templates corresponding to bounded rotations and scalings relative to the template that matched the candidate finger in the reference image. When a finger is located (306), the finger detection in the reference image is confirmed (308). Otherwise, no match is found and the candidate finger is likely a false positive.

Although specific processes for searching for an alternate view image of a candidate finger in one or more alternate view images are described above with respect to FIGS. 10-12, any of a variety of processes can be utilized to locate alternate views of candidate fingers in alternate view images in accordance with embodiments of the invention. For example, much of the discussion above is in the context of searching epipolar lines within rectified images. In many embodiments, the images are not rectified and the image processing system simply uses calibration information to identify specific pixels that lie in regions surrounding epipolar lines as the bounded search is performed. In this way, the computational load associated with rectifying the entire alternate view image can be reduced by only performing rectification with respect to specific pixels of interest when performing template matching.

Once a candidate finger and then an initialization gesture is detected, an initialization process can be performed. In many embodiments, the initialization process includes setting the image capture parameters of the at least one camera in the real-time gesture based interactive system. Processes for setting image capture settings for use during tracking of a hand gestures in accordance with an embodiment of the invention are discussed below.

Initializing Camera Settings

Template matching processes similar to those described above for use in real-time tracking of human hands can achieve improved performance using high contrast images of a scene including an object that is being tracked. In many embodiments, the process of initializing a real-time gesture based interactive system in preparation for tracking a human hand during a gesture based interactive session can include setting the image capture settings of a camera to obtain high contrast subject to the dynamic range and brightness of the scene.

Figure 13:
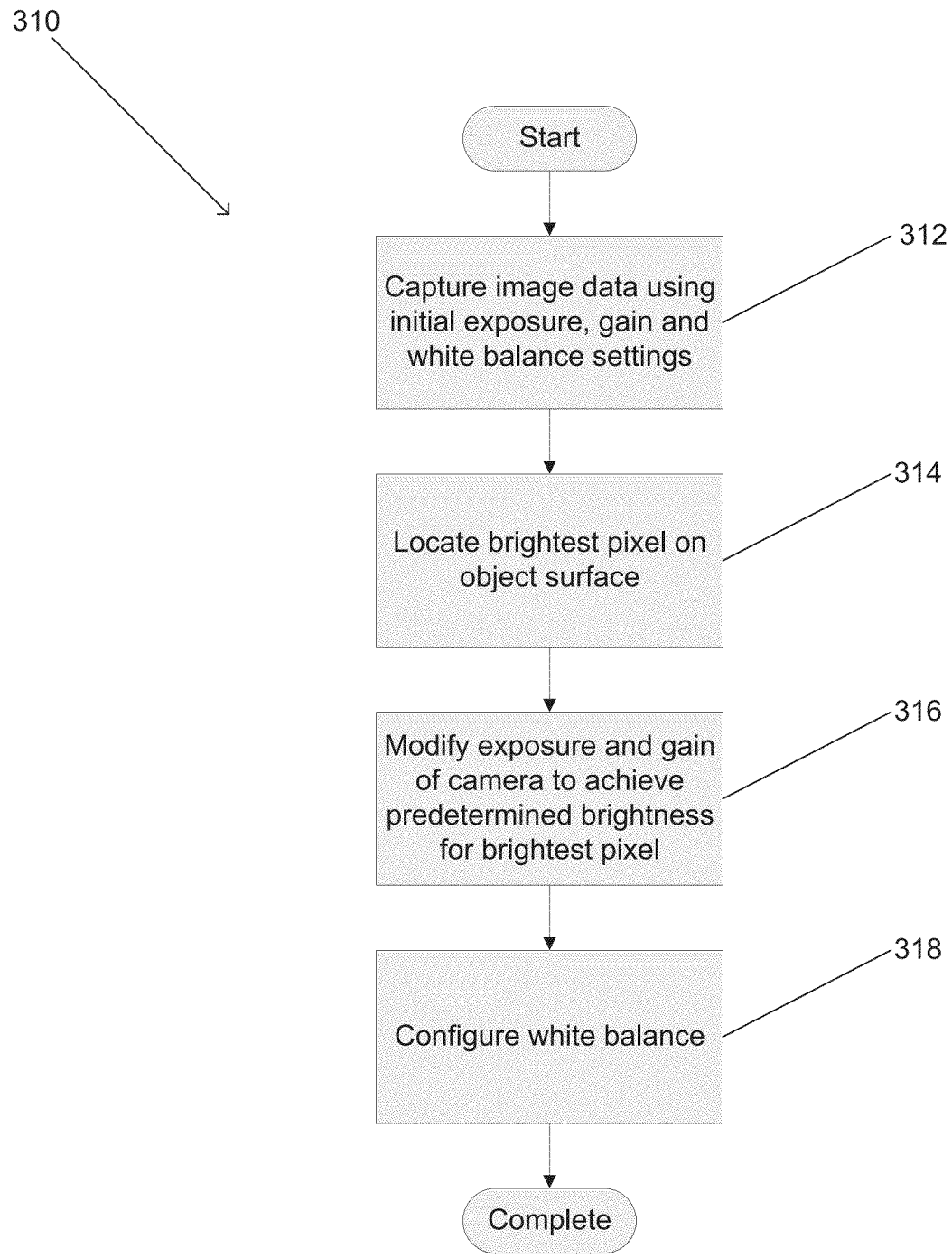
FIG. 13 is a flow chart of a process for configuring image capture settings during an initialization process in accordance with an embodiment of the invention.

A process for configuring the image capture parameters of a camera to obtain high contrast images of a human hand for use in tracking the human hand in accordance with an embodiment of the invention is illustrated in FIG. 13. The process 310 includes capturing image data using an initial set of image capture settings including (but not limited to) an initial exposure setting and an initial gain setting determined using the auto-exposure and/or auto-gain controls of the camera, and an initial white balance setting determined using the automatic white balance controls of the camera. A hand can be detected within the captured image using a process similar to the processes described above. In embodiments where a parts based template matching process is utilized, at least one finger is detected from which the pose of the human hand can be inferred. The brightest pixel on the detected object surface can be identified (314) by performing a search within a region defined by the template used to identify the object.

In many embodiments, the exposure and gain of the camera are adjusted (316) so that the brightest pixel on the surface of the detected object achieves a predetermined brightness value. In a number of embodiments, any of a variety of criteria can be utilized to adjust the exposure and gain of the camera including (but not limited to) using outlier rejection in determining the brightest pixel, adjusting the exposure and gain based upon a pixel within a predetermined relative brightness of the brightest pixel on the surface of the detected object, the darkest pixel on the surface of the detected object, and/or the average brightness of pixels on the surface of the detected object. In several embodiments, the adjustment involves adjusting the exposure time subject to the frame rate at which images are captured by the camera. In a number of embodiments, frame rate can be decreased to accommodate increased exposure. In the event that increasing exposure is insufficient to achieve the desired level of intensity, then gain can also be adjusted until the appropriate brightness is achieved. The white level balance can then be configured (318) based upon the exposure and gain settings.

Although specific processes for adjusting image capture settings during an initialization process are described above, any of a variety of processes for configuring the image capture settings of cameras used to track gestures can be utilized as appropriate to the requirements of a specific application in accordance with embodiments of the invention. As discussed above, initialization processes can also include collection of skin color information with respect to a hand that is being tracked. Processes for collecting skin color information in accordance with embodiments of the invention are discussed further below.

Capturing Skin Color Information

Skin color information can be useful in tracking hands during a gesture based interactive session. Colors corresponding to skin tones can depend upon the skin of the user and the image capture settings of the camera(s) used to capture images of the scene containing the tracked hand. In many embodiments, the image capture settings of the cameras in a real-time gesture based interactive system are set during an initialization process. Once the cameras are configured during the initialization process, skin color information can be obtained by looking at the color of pixels on the surface of the object detected using the template matching processes described above. In several embodiments, all of the pixels visible on the surface of the detected object or a sample of pixels on the surface of the detected object within one more frames containing the object are used to determine skin color information. In a number of embodiments, colors corresponding to skin color of the user's hand are identified by forming a histogram of pixel colors. In a number of embodiments, the histogram is a two dimensional histogram of pixel intensity values in the Red and Green color channels. Based upon the template, any of a variety of techniques can be utilized to determine combinations of pixel intensities in the Red and Green channels that will be considered to correspond to skin colors. In several embodiments, a threshold is applied to the histogram to determine pixel intensities in the Red and Green channels that will be considered to correspond to skin colors. In several embodiments, the histograms are determined using a normalized intensities in the Red channel R/(R+G+B) and a normalized intensities in the Green channel R/(R+G+B). In other embodiments, any of a variety of techniques can be utilized to detect skin colors based upon pixels observed on the surface of a detected human hand in at least one frame of video in which the human hand is detected as appropriate to the requirements of a specific application.

Figure 14:
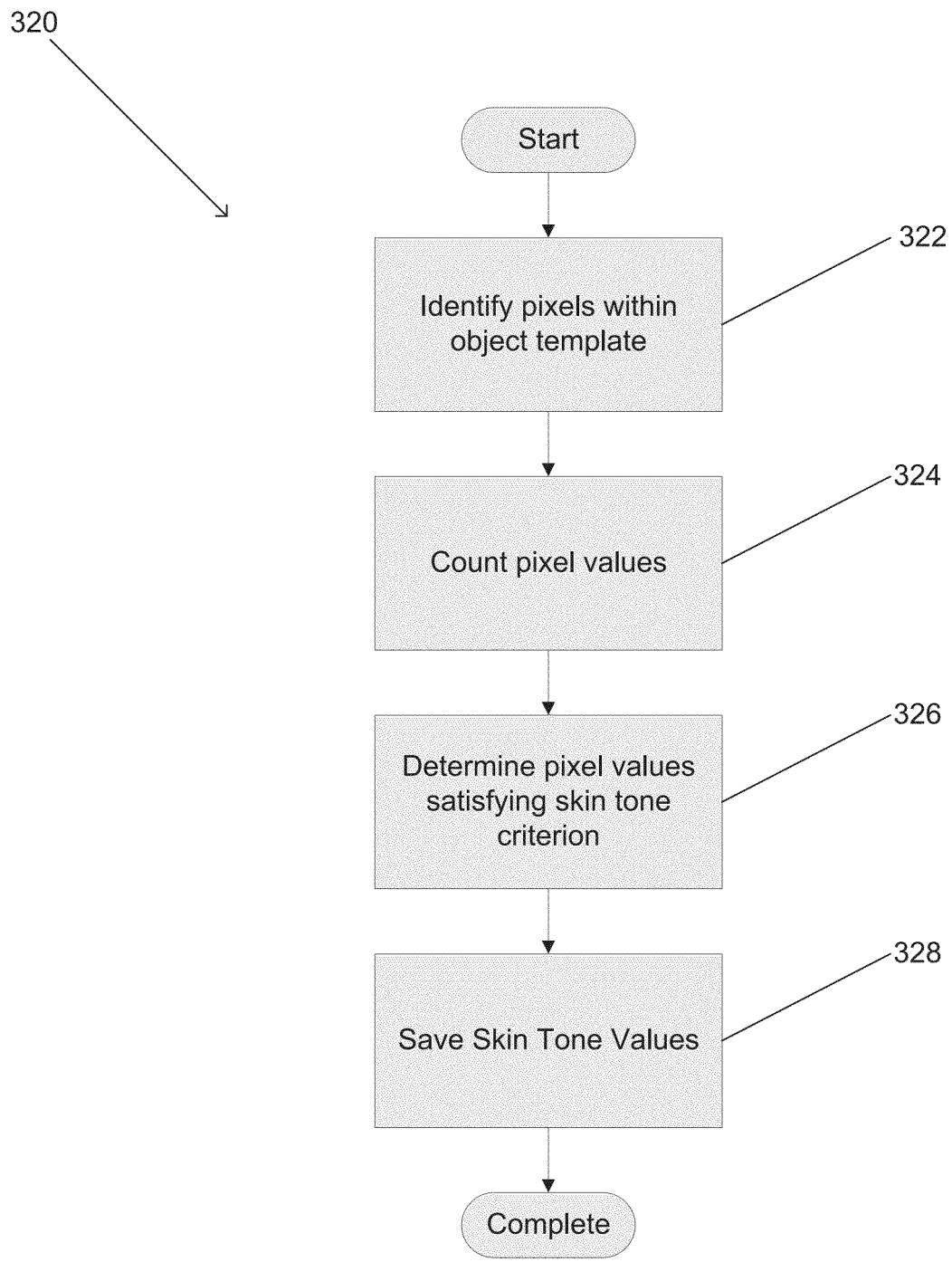
FIG. 14 is a flow chart of a process for determining skin color values during an initialization process in accordance with an embodiment of the invention.

A process for obtaining skin color information from images of a human hand in accordance with an embodiment of the invention is illustrated in FIG. 14. The process 320 includes identifying (322) pixels on the surface of an object in one or more frames of video. In several embodiments, the pixels corresponding to the object surface can be determined with reference to a template used to locate the object within the scene. The number of pixels having specific intensity values and/or intensity values falling within specific ranges can be counted (324). As discussed above, the counts can be based upon combinations of intensity in the Red and Green color channels and/or combination of intensity in the Red and Green channels normalized with respect to the brightness of the pixel in all three color channels. In other embodiments, any of a variety of techniques can be used to count pixels based upon their brightness values in one or more color channels. The specific criteria utilized in counting the pixels can be referred to as the pixel color for the purpose of discussing the manner in which the counts can be utilized to identify pixel values satisfying a skin color criterion. Based upon the counts, skin color information can be determined by identifying the pixel colors satisfying a predetermined skin tone criterion. In many embodiments, the criterion can involve the pixel color being within a threshold distance of the mean, median and/or mode pixel color identified using the counts. In a number of embodiments, the criterion can specify a distance whereby a threshold percentage of the pixels counted are considered to be skin color pixels. In other embodiments, any of a variety of criterion appropriate to the requirements of a specific application can be utilized.

Once the pixel colors corresponding to skin colors have been determined, the pixel values corresponding to skin colors can be saved as skin color information for use by a skin color classifier. In many embodiments, skin color classifiers are used as an additional template modality in tracking the hand utilized to derive the skin color information. Although specific processes for obtaining skin color information are described above with respect to FIG. 14, any of a variety of processes appropriate to the requirements of specific applications can be utilized in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A real-time gesture based interactive system, comprising:
    a processor;
    a reference camera configured to capture sequences of frames of video data, where each frame of video data comprises intensity information for a plurality of pixels;
    memory containing:
        a hand tracking application; and
        a set of edge feature templates comprising a plurality of edge feature templates that are rotated and scaled versions of a base template;
    wherein the hand tracking application configures the processor to:
        obtain a sequence of frames of video data from the reference camera;
        compare successive frames of video data from the sequence of frames of video data for pixels that are moving;
        determine whether any of the pixels that changed are part of a human hand visible in the sequence of frames of video data, where a part of a human hand is identified by searching the frame of video data for a grouping of pixels that have image gradient orientations that match the edge features of one of the plurality of edge feature templates; and
        track the motion of the part of the human hand visible in the sequence of frames of video data;
        confirm that the tracked motion of the part of the human hand visible in the sequence of frames of video data corresponds to a predetermined initialization gesture, wherein the predetermined initialization gesture comprises a finger oscillating from side to side within a predetermined gesture range; and
        commence tracking the human hand as part of a gesture based interactive session.

2. The real-time gesture based interactive system of claim 1, wherein the hand tracking application configures the processor to identify pixels in successive frames of video that change from one frame to the next by subtracting the successive frames of video to identify pixel value differences exceeding a predetermined threshold.

3. The real-time gesture based interactive system of claim 1, wherein the hand tracking application configures the processor to confirm that the tracked motion of the part of the human hand visible in the sequence of frames of video data corresponds to a predetermined initialization gesture by verifying that the extent of the motion of a human hand visible in the sequence of frames of video data is below a predetermined threshold.

4. The real-time gesture based interactive system of claim 1, wherein the hand tracking application further configures the processor to initialize the image capture settings of the reference camera used during the gesture based interactive session.

5. The real-time gesture based interactive system of claim 4, wherein the hand tracking application configures the processor to:
    obtain the sequence of frames of video data from the reference camera using initial image capture settings; and
    adjust the exposure and gain of the reference camera as additional frames of video data are captured by the reference camera so that the brightness of at least one pixel that is part of a human hand visible in the additional frames of video data satisfies a predetermined criterion.

6. The real-time gesture based interactive system of claim 5, wherein the hand tracking application configures the processor to determine the initial image capture settings using auto-exposure and auto-gain controls of the reference camera.

7. The real-time gesture based interactive system of claim 6, wherein the hand tracking application configures the processor to determine an initial white balance setting using automatic white balance controls of the reference camera.

8. The real-time gesture based interactive system of claim 5, wherein the hand tracking application configures the processor to adjust the exposure and gain of the reference camera as additional frames of video data are captured by the reference camera by adjusting the exposure and gain of the reference camera as additional frames of video data are captured by the reference camera so that the brightest pixel that remains after performing outlier rejection and that is part of a human hand visible in the additional frames of video data is a predetermined brightness value.

9. The real-time gesture based interactive system of claim 8, wherein the hand tracking application configures the processor to determine the brightest pixel remains after performing outlier rejection and that is part of a human hand visible in one of the additional frames of video data by performing a search within a region defined by the one of the plurality of edge feature templates used to identify the part of the human hand visible in the additional frame of video data.

10. The real-time gesture based interactive system of claim 5, wherein the hand tracking application configures the processor to adjust the exposure and gain of the reference camera as additional frames of video data are captured by the reference camera so that pixels that are part of a human hand visible in the additional frames of video data satisfy a predetermined brightness criterion.

11. The real-time gesture based interactive system of claim 5, wherein the hand tracking application configures the processor to adjust the exposure and gain of the reference camera as additional frames of video data are captured by the reference camera so that pixels that are part of a human hand visible in the additional frames of video data satisfy a predetermined average brightness criterion.

12. The real-time gesture based interactive system of claim 5, wherein the hand tracking application configures the processor to adjust the exposure and gain of the reference camera as additional frames of video data are captured by the reference camera so that the darkest pixel that remains after performing outlier rejection and that is part of a human hand visible in the additional frames of video data satisfies a predetermined brightness criterion.

13. The real-time gesture based interactive system of claim 5, wherein the hand tracking application configures the processor to adjust the white level balance of the reference camera based upon the exposure and gain settings of the reference camera.

14. The real-time gesture based interactive system of claim 1, wherein:
each frame of video data captured by the reference view camera includes color information for a plurality of pixels comprising intensity information in a plurality of color channels; and
the hand tracking application further configures the processor to initialize a skin color classifier used during the gesture based interactive session.

15. The real-time gesture based interactive system of claim 14, wherein the hand tracking application further configures the processor to initialize a skin color classifier based upon the colors of a plurality of pixels that are part of a human hand visible in the sequence of frames of video data.

16. The real-time gesture based interactive system of claim 15, wherein the hand tracking application further configures the processor to initialize a skin color classifier based upon the colors of a plurality of pixels that are part of a human hand visible in the sequence of frames of video data by forming a histogram of the colors of the plurality of pixels.

17. The real-time gesture based interactive system of claim 16, wherein the histogram is a two dimensional histogram of pixel intensity values in Red and Green color channels.

18. The real-time gesture based interactive system of claim 16, wherein the histogram is determined using normalized intensities in the Red channel $R/(R+G+B)$ and normalized intensities in the Green channel $R/(R+G+B)$.

19. The real-time gesture based interactive system of claim 16, wherein the hand tracking application further configures the processor to determine skin color information by identifying the pixel colors within the histogram satisfying a predetermined skin tone criterion.

20. The real-time gesture based interactive system of claim 19, wherein the hand tracking application further configures the processor to apply a threshold to the histogram to determine pixel intensities in Red and Green color channels that will be considered to correspond to skin colors.

21. The real-time gesture based interactive system of claim 19, wherein the criterion involves the pixel color being within a threshold distance of at least one selected from the group consisting of the mean, median and mode pixel color of the histogram.

22. The real-time gesture based interactive system of claim 19, wherein the criterion involves the pixel colors of a threshold percentage of pixels within the histogram being considered to be skin colors.

23. The real-time gesture based interactive system of claim 1, wherein the hand tracking application further configures the processor to define a 3D interaction zone relative to the motion of the part of the human hand visible in the sequence of frames of video data.

24. The real-time gesture based interactive system of claim 23, wherein the hand tracking application configures the processor to identify gestures within an interaction zone during a gesture based interactive session.

25. The real-time gesture based interactive system of claim 23, wherein the interaction zone is defined relative to the location of a detected part of a human hand based upon a predetermined gesture range.

26. The real-time gesture based interactive system of claim 1, wherein the hand tracking application further configures the processor to:
determine the size of a part of a human hand visible in the sequence of frames of video data by determining the scale of the edge feature template that matches the part of the human hand visible in the sequence of frames of video data at a known distance from the reference camera; and
use the size of the part of a human hand visible in the sequence of frames to determine the distance to the part of a human hand visible in additional frames of video captured by the reference camera during the gesture based interactive session.

27. The real-time gesture based interactive system of claim 1 wherein the edge features of the base template are synthetically generated.

28. The real-time gesture based interactive system of claim 1, wherein the plurality of edge feature templates are stored in a data structure that includes metadata describing the rotation and scaling applied to the finger template to obtain a given edge feature template within the data structure.

29. The real-time gesture based interactive system of claim 1, wherein the hand tracking application configures the processor to search the frame of video data for a grouping of pixels that have image gradient orientations that match a given edge feature template from the plurality of edge feature templates by:

selecting a grouping of pixels;
searching within a predetermined neighborhood of pixels relative to each edge feature in the given edge feature template to find the image gradient orientation that is most similar to the image gradient orientation of the edge feature; and
determining the similarity of the grouping of pixels to the given edge feature template based upon a measure of the similarity of the most similar image gradient orientations found within the grouping of pixels for each of the edge features in the given edge feature template.

30. The real-time gesture based interactive system of claim 29, wherein the hand tracking application configures the processor to determine image gradient orientation based upon a change in intensity of neighboring pixels in the video data.

31. The real-time gesture based interactive system of claim 29, wherein:
each frame of video data captured by the reference view camera includes color information for a plurality of pixels comprising intensity information in a plurality of color channels; and
the hand tracking application configures the processor to determine image gradient orientation based upon a change in the color of neighboring pixels in the video data in at least one color channel.

32. The real-time gesture based interactive system of claim 31, wherein the video data comprises color information for a plurality of pixels in blue, green and red color channels.

33. The real-time gesture based interactive system of claim 31, wherein the hand tracking application configures the processor to determine image gradient orientation by computing the orientation of gradients in red and green color channels separately and using the gradient orientation of the channel whose magnitude is the largest.

34. The real-time gesture based interactive system of claim 31, wherein the hand tracking application configures the processor to determine image gradient orientation by computing the orientation of gradients in blue, green, and red color channels separately and using the gradient orientation of the channel whose magnitude is the largest.

35. The real-time gesture based interactive system of claim 1 wherein the hand tracking application configures the processor to search the frame of video data (I) for a grouping of pixels that have image gradient orientations that match a given edge feature template ($\mathcal{T}$) from the plurality of edge feature templates by determining whether the similarity of a number of gradient orientations extracted from the given edge feature template at a list P of locations r to be considered from edge features ($\mathcal{O}$) in the given edge feature template and image gradient orientations extracted from the frame of video data relative to a pixel location c exceed a predetermined matching threshold using the following similarity measure:

$$\mathcal{E}(I, \mathcal{T}, c) = \sum_{r \in P} \left( \max_{t \in R(c+r)} |\cos(ori(\mathcal{O}, r) - ori(I, t))| \right)$$

where $$R(c+r) = \left[ c + r - \frac{T}{2}, c + r + \frac{T}{2} \right] \times \left[ c + r - \frac{T}{2}, c + r + \frac{T}{2} \right]$$

defines a predetermined neighborhood of size T centered on the pixel location c+r within the frame of video data.

36. The real-time gesture based interactive system of claim 35, wherein the hand tracking application configures the processor to quantize the image gradient orientations into a predetermined number ($n_o$) of values that can each be represented by a single bit.

37. The real-time gesture based interactive system of claim 36, wherein the hand tracking application configures the processor to calculate the similarity measure by spreading the quantized image gradient orientation at pixel location t (ori (I,t)) in a T×T window around the pixel location t and encoding the spread image gradient orientations using a binary string of length $n_o$, where each bit in the string corresponds to each quantized image gradient orientation present in the T×T window.

38. The real-time gesture based interactive system of claim 37, wherein the hand tracking application configures the processor to:
precompute lookup tables of $\max_{t \in R(c+r)} |\cos(ori(\mathcal{O}, r) - ori(I,t))|$ for each possible orientation ori($\mathcal{O}$,r) of an edge feature at a given pixel location t in the video image data; and
evaluate the similarity measure for the given edge feature template using the precomputed lookup tables.

39. The real-time gesture based interactive system of claim 35, wherein the hand tracking application determines the pixel locations (c) searched within the frame of video data using information including the pixel location of a previously identified finger.

40. The real-time gesture based interactive system of claim 39, wherein the hand tracking application determines the pixel locations (c) searched using information further comprising the velocity of a previously identified finger.

41. The real-time gesture based interactive system of claim 35, where the hand tracking application configures the processor to:
detect the presence and initial location of at least one finger by recognizing an initialization gesture; and
determine the pixel locations (c) searched within the frame of video data using information including the initial location of the at least one finger.

42. The real-time gesture based interactive system of claim 35, wherein:
the memory contains video data of a previous frame; and
the hand tracking application configures the processor to determine the pixel locations (c) searched within the frame of video data using information including pixels in the frame of video data that have changed relative to the pixels in the video data of the previous frame.

43. The real-time gesture based interactive system of claim 1, further comprising:
an alternate view camera configured to capture sequences of frames of video data, where each frame of video data comprises intensity information for a plurality of pixels;
wherein the hand tracking application further configures the processor to:
obtain a sequence of frames of video from the alternate view camera; and
verify that a part of a human hand visible in the sequence of frames of video data obtained from the reference camera is part of a human hand by locating a grouping of pixels in the alternate view frame of video data that correspond to the part of a human hand.

44. The real-time gesture based interactive system of claim 43, wherein the hand tracking application configures the processor to locate a grouping of pixels in the alternate view frame of video data that correspond to the part of a human hand by searching along an epipolar line within the alternate view image for a grouping of pixels that have image gradient orientations that match one of the plurality of edge feature templates, where the epipolar line is defined by the relative location of the center of the reference camera and the center of the alternate view camera.

45. The real-time gesture based interactive system of claim 44, wherein the hand tracking application is configured to search along an epipolar line within the alternate view frame of video for a grouping of pixels that have image gradient orientations that match one of the plurality of edge feature templates by performing a search with respect to pixels within a predetermined margin relative to the epipolar line.

46. The real-time gesture based interactive system of claim 44, wherein the hand tracking application is configured to search along an epipolar line within the alternate view frame of video for a grouping of pixels that have image gradient orientations that match one of the plurality of edge feature templates that is rotated and scaled within predetermined limits relative to the base template.

47. The real-time gesture based interactive system of claim 44, wherein the hand tracking application is configured to search along an epipolar line within the alternate view frame of video for a grouping of pixels that have image gradient orientations that match one of the plurality of edge feature templates that is rotated and scaled within permitted limits relative to the base template that are determined based upon the disparity between the grouping of pixels in the alternate view image and the candidate finger in the reference image.

48. The real-time gesture based interactive system of claim 47, wherein the permitted rotation limits increase with increased disparity.

49. The real-time gesture based interactive system of claim 42, wherein the distance from the reference camera to the part of a human hand is determined based upon the disparity between the part of the human hand visible in the sequence of frames of video data obtained from the reference camera and the grouping of pixels in the frames of video data obtained from the alternate view camera that correspond to the part of the human hand.

50. The real-time gesture based interactive system of claim 49, wherein the hand tracking application is configured to search along the epipolar line within the alternate view frame of video to obtain disparity measurements with pixel precision.

51. The real-time gesture based interactive system of claim 49, wherein the hand tracking application is configured to perform a search along the epipolar line within the alternate view frame of video involving resampling the alternate view frame of video to obtain disparity measurements with sub-pixel precision.

52. The real-time gesture based interactive system of claim 49, wherein the hand tracking application is configured to rectify the alternate view frame of video relative to the reference frame of video.

53. The real-time gesture based interactive system of claim 44, wherein the hand tracking application is configured to use calibration to perform rectification of pixels that lie in regions surrounding the epipolar line in the alternate view frame of video data to search for a grouping of pixels that have image gradient orientations that match one of the plurality of edge feature templates.

54. A real-time gesture based interactive system, comprising:
   a processor;
   a reference camera configured to capture sequences of frames of video data, where each frame of video data comprises color information for a plurality of pixels;
   memory containing:
      a hand tracking application; and
      a set of edge feature templates comprising a plurality of edge feature templates that are rotated and scaled versions of a base template;
   wherein the hand tracking application configures the processor to:
      obtain a sequence of frames of video data from the reference camera using initial image capture settings;
      compare successive frames of video data from the sequence of frames of video data for pixels that change from one frame to the next;
      determine whether any of the pixels that changed are part of a human hand visible in the sequence of frames of video data, where a part of a human hand is identified by searching the frame of video data for a grouping of pixels that have image gradient orientations that match the edge features of one of the plurality of edge feature templates; and
      track the motion of the part of the human hand visible in the sequence of frames of video data;
      confirm that the tracked motion of the part of the human hand visible in the sequence of frames of video data corresponds to a predetermined initialization gesture, where the predetermined initialization gesture comprises a finger oscillating from side to side within a predetermined gesture range;
      initialize the image capture settings of the reference camera used during the gesture based interactive session by adjusting the exposure and gain of the reference camera as additional frames of video data are captured by the reference camera so that the brightness of at least one pixel that is part of a human hand visible in the additional frames of video data satisfies a predetermined criterion; and
      commence tracking the human hand as part of a gesture based interactive session.

55. A method of commencing tracking of a human hand using a real-time gesture based interactive system, comprising:
   obtaining a sequence of frames of video data from the reference camera;
   comparing successive frames of video data from the sequence of frames of video data for pixels that change from one frame to the next using a processor configured using a hand tracking application;
   determining whether any of the pixels that changed are part of a human hand visible in the sequence of frames of video data using the processor configured using the hand tracking application, where a part of a human hand is identified by searching the frame of video data for a grouping of pixels that have image gradient orientations that match the edge features of one of the plurality of edge feature templates; and
   tracking the motion of the part of the human hand visible in the sequence of frames of video data using the processor configured using the hand tracking application;
   confirming that the tracked motion of the part of the human hand visible in the sequence of frames of video data corresponds to a predetermined initialization gesture using the processor configured using the hand tracking application, wherein the predetermined initialization gesture comprises a finger oscillating from side to side within a predetermined gesture range; and
   commence tracking the human hand as part of a gesture based interactive session using the processor configured using the hand tracking application.

* * * * *